(12) United States Patent
Ruel et al.

(10) Patent No.: US 11,688,172 B2
(45) Date of Patent: Jun. 27, 2023

(54) OBJECT IMAGING AND DETECTION SYSTEMS AND METHODS

(71) Applicant: DRILLDOCS COMPANY, Houston, TX (US)

(72) Inventors: Francois Ruel, Victoriaville (CA); Martin E. Oehlbeck, Cohocton, NY (US); Deep Rajendrakumar Joshi, Houston, TX (US); Calvin Stuart Holt, Houston, TX (US)

(73) Assignee: DRILLDOCS COMPANY, Houston, TX (US)

( * ) Notice: Subject to any disclaimer, the term of this patent is extended or adjusted under 35 U.S.C. 154(b) by 0 days.

(21) Appl. No.: 17/917,782

(22) PCT Filed: May 13, 2022

(86) PCT No.: PCT/US2022/029230
§ 371 (c)(1),
(2) Date: Oct. 7, 2022

(87) PCT Pub. No.: WO2022/241238
PCT Pub. Date: Nov. 17, 2022

(65) Prior Publication Data
US 2023/0122264 A1  Apr. 20, 2023

Related U.S. Application Data

(60) Provisional application No. 63/188,107, filed on May 13, 2021.

(51) Int. Cl.
*G06K 9/00* (2022.01)
*G06V 20/52* (2022.01)
(Continued)

(52) U.S. Cl.
CPC ............ *G06V 20/52* (2022.01); *G06T 7/0004* (2013.01); *G06T 7/20* (2013.01); *G06T 7/70* (2017.01);
(Continued)

(58) Field of Classification Search
CPC .................................................. G06T 7/0004
See application file for complete search history.

(56) References Cited

U.S. PATENT DOCUMENTS

| 7,933,018 B2 | 4/2011 | Vannuffelen et al. |
| 8,818,779 B2 | 8/2014 | Sadlier et al. |

(Continued)

FOREIGN PATENT DOCUMENTS

WO    2021054840    3/2021

OTHER PUBLICATIONS

International Search Report and Written Opinion for PCT/US2022/034092, dated Nov. 4, 2022, 15 pgs.
(Continued)

*Primary Examiner* — Hadi Akhavannik

(57) ABSTRACT

A method including selecting image data of a mechanical mud separation machines ("MMSM") to detect objects in an object flow and other operational conditions at the MMSM. The image data may be processed by a Deep Neural Network to identify objects in the object flow, operational parameters of the MMSM, and environmental conditions. Additional image data may be selected for additional processing based on the results of the analysis.

13 Claims, 15 Drawing Sheets

(51) Int. Cl.
*G06T 7/70* (2017.01)
*G06V 10/25* (2022.01)
*G06V 10/82* (2022.01)
*G06V 20/40* (2022.01)
*G06V 10/764* (2022.01)
*G06T 7/00* (2017.01)
*G06T 7/20* (2017.01)
*H04N 7/18* (2006.01)

(52) U.S. Cl.
CPC ............ *G06V 10/25* (2022.01); *G06V 10/764* (2022.01); *G06V 10/82* (2022.01); *G06V 20/41* (2022.01); *H04N 7/188* (2013.01); *G06T 2207/10016* (2013.01); *G06T 2207/20084* (2013.01); *G06T 2207/30108* (2013.01)

(56) References Cited

U.S. PATENT DOCUMENTS

| | | | |
|---|---|---|---|
| 9,046,509 | B2 | 6/2015 | Dvorkin et al. |
| 9,651,468 | B2 | 5/2017 | Rowe et al. |
| 9,670,775 | B2 | 6/2017 | Tjhang et al. |
| 9,912,918 | B2 | 3/2018 | Samuel |
| 9,951,607 | B2 | 4/2018 | Wessling et al. |
| 10,019,875 | B1 | 7/2018 | Alghooneh et al. |
| 10,151,677 | B2 | 12/2018 | Kulkarni et al. |
| 10,633,941 | B2 | 4/2020 | Teodorescu |
| 10,643,322 | B2 | 5/2020 | Holton et al. |
| 10,683,178 | B2 * | 6/2020 | Lanoue .............. B01D 33/0346 |
| 10,781,692 | B2 | 9/2020 | Francois et al. |
| 10,796,424 | B2 | 10/2020 | Parmeshwar et al. |
| 10,927,671 | B1 | 2/2021 | Tonner et al. |
| 10,954,729 | B2 | 3/2021 | Torrione et al. |
| 2006/0127298 | A1* | 6/2006 | Westerberg .............. C01D 1/22 423/430 |
| 2006/0162962 | A1 | 7/2006 | Koederitz et al. |
| 2010/0044034 | A1 | 2/2010 | Bailey |
| 2010/0193249 | A1* | 8/2010 | Saiz ........................ E21B 21/06 175/207 |
| 2011/0210083 | A1 | 9/2011 | Scott et al. |
| 2011/0220410 | A1 | 9/2011 | Aldred |
| 2011/0308784 | A1* | 12/2011 | Ollerenshaw ........... E21B 17/06 166/181 |
| 2014/0020954 | A1 | 1/2014 | Pelletier et al. |
| 2014/0214325 | A1 | 7/2014 | Wessling et al. |
| 2014/0333754 | A1 | 11/2014 | Graves et al. |
| 2015/0013448 | A1 | 1/2015 | Smith |
| 2015/0235544 | A1 | 8/2015 | Hernandez et al. |
| 2016/0090799 | A1 | 3/2016 | Geehan et al. |
| 2016/0130928 | A1 | 5/2016 | Torrione |
| 2016/0370274 | A1 | 12/2016 | Rowe et al. |
| 2017/0044844 | A1* | 2/2017 | Ollerenshaw ......... E21B 47/007 |
| 2017/0056928 | A1 | 3/2017 | Torrione |
| 2017/0056929 | A1 | 3/2017 | Torrione |
| 2017/0058620 | A1 | 3/2017 | Torrione |
| 2017/0058621 | A1 | 3/2017 | Bailey |
| 2017/0314369 | A1 | 11/2017 | Rosano |
| 2019/0302310 | A1 | 10/2019 | Fox et al. |
| 2019/0368287 | A1 | 12/2019 | Shekhar et al. |
| 2019/0368347 | A1 | 12/2019 | Kulkarni et al. |
| 2020/0004225 | A1* | 1/2020 | Buller .................. B29C 64/393 |
| 2020/0126386 | A1 | 4/2020 | Michakopulos et al. |
| 2020/0157929 | A1 | 5/2020 | Torrione |
| 2020/0284145 | A1 | 9/2020 | Elgamal |
| 2020/0299145 | A1* | 9/2020 | Ning ....................... C01F 7/066 |
| 2020/0326322 | A1 | 10/2020 | Farrukh Hamza |
| 2020/0332654 | A1 | 10/2020 | Rowe et al. |
| 2020/0363289 | A1 | 11/2020 | Shekhar et al. |
| 2021/0008467 | A1* | 1/2021 | Wang ................. B01D 21/2438 |
| 2021/0019875 | A1 | 1/2021 | Parmeshwar et al. |
| 2021/0027144 | A1 | 1/2021 | Madasu et al. |
| 2021/0090239 | A1 | 3/2021 | Pattnaik et al. |
| 2021/0172251 | A1* | 6/2021 | Leung ....................... E21B 4/02 |
| 2021/0189813 | A1 | 6/2021 | Torrione |
| 2022/0017393 | A1* | 1/2022 | Li ........................... C02F 3/109 |

OTHER PUBLICATIONS

Iastrebov, "Conceptual Design of Drilling Cuttings Analysis System Based on Machine Learning Techniques", Diss. University of Leoben, Jul. 2020, 44 pgs.

Xunsheng et. al., "Classifying Cutting, Volume at Shale Shakers in Real-Time Via Video Streaming Using Deep-Learning Techniques", SPE Drilling & Completion, 2020, 12 pgs.

Marana, et al., "An Intelligent System for Petroleum Well Drilling Cutting Analysis", International Conference on Adaptive and Intelligent Systems, 2009, 6 pgs.

Guilherme, et al., "Fast Petroleum Well Drilling Monitoring Through Optimum-Path Forest", Journal of Next Generation Information Technology, vol. 1, No. 1, May 2010, 9 pgs.

Marana, et al., "An Intelligent System to Detect Drilling Problems Through Drilled Cuttings Return Analysis", IADC/SPE Drilling Conference annd Exhibition, Feb. 2010, 8 pgs.

Han, et al., "Real-time 3d Computer Vision Shape Analysis of Cuttings and Cavings", SPE Annual Technical Conference and Exhibition 2018: SPE-191634-MS, Sep. 24, 2018, 16 pgs.

Covar Applied Technologies, "Video Processing for Improved Drilling", DEA, Mar. 20, 2013, 25 pgs.

Schuurmans, "Classification of Images in Real Time with Image Analytics", Halliburton Landmark Innovation Forum & Expo 2019, Aug. 28, 2019, 23 pgs.

Han, "Automated Computer Vision System for Real-Time Drilling Cuttings Monitoring", Thesis, The Graduate School of The University of Texas at Austin, Aug. 2016, 112 pgs.

Ripperger, et al., "Safer and Faster Drilling Through AI Driven Cuttings Monitoring—An Operators Approach", ADIPEC, Abu Dhabi, UAE, SPE-211759-MS, Oct. 31, 2022-Nov. 3, 2022, 18 pgs.

Non-Final Office Action, U.S. Appl. No. 17/190,397, dated Feb. 23, 2023, 16 pgs.

PCT International Search report and Written Opinion in International Application PCT/US2022/029230, dated Sep. 27, 2022, 9 pgs.

* cited by examiner

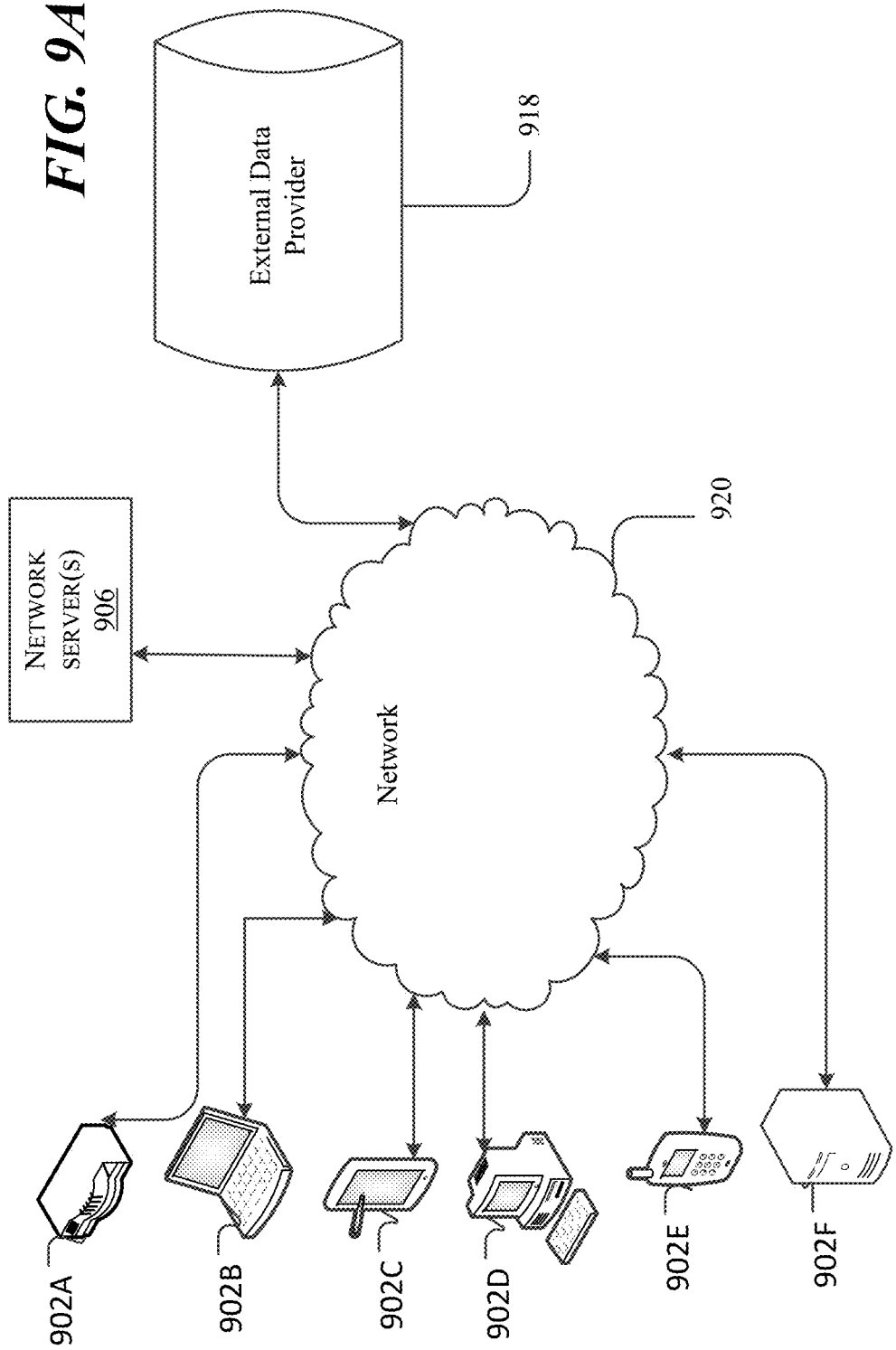

US 11,688,172 B2

OBJECT IMAGING AND DETECTION SYSTEMS AND METHODS

CLAIM OF PRIORITY

This application is a U.S. National Stage application of PCT No. PCT/US2022/029230, which claims priority to and the benefit of U.S. Provisional Application No. 63/188,107 filed May 13, 2021, titled "Object Imaging and Detection System and Method," the disclosures of which are hereby incorporated by reference herein in their entirety.

BACKGROUND

Increasing the effectiveness of pumping, cementing, and drilling operations can reduce the cost of drilling wells for oil and gas and geothermal exploration. One way of determining the efficiency of these processes is to observe the characteristic features of wellbore objects flowing to the surface from a wellbore.

Objects returned from the wellbore during drilling can provide a great deal of information about the subsurface environment. For example, by observing wellbore objects, operators may glean insight into the behavior and characteristics of the wellbore and the condition of drilling and rig equipment (e.g., indicating wellbore instability, poor hole cleaning, and/or tool failures). Current drilling and pumping operations require rig-based personnel to inspect for these objects. Under the current technology, a mud engineer, drill crew, or mud logger must monitor and detect them at one or more multiple mechanical mud separation machines (MMSM). Manual observation of wellbores is intermittent, costly, and error-prone. As a result, conditions or events related to the downhole bore operations often go undetected.

There have been previous attempts to use imaging or sensing systems to monitor and support onsite and remote operations. Some techniques try to measure or image activity downhole, weigh cuttings at the shaker or perform microscopic or visual analysis of small samples from the object flow. Previous attempts have not been successful due to a number of deficiencies, including the scope of data and image capture and processing. The location of wellbores may be remote. The remoteness of the wellbores often limits the ability to capture, process, and send data related to the automated monitoring activities. For example, certain operational/environmental conditions present at MMSM's prevent objects from being imaged correctly. Steam, rain, variable lighting conditions (e.g., cloudy areas, sunny spots), rain, and fog often interfere with obtaining usable images of objects of interest. Additionally, due to poor data transmission rates over networks at some MMSMs, the computing analysis is often required to be relatively close to the MMSM. Additionally, current monitoring locations often have harsh and changing environmental conditions, which leads to poor data capture. For example, current image capture solutions center on imaging the surface of the separation screens. These separation screens are subject to vibration and fluid saturation, which results in image distortion. Further, object flow at these surface screens often has overlapping debris, which makes the resulting image data relatively less useful.

Thus, it remains desirous to design automated object-flow monitoring systems and methods that can be used in MMSM locations and that are capable of identifying wellbore characteristics in harsh environmental/operational conditions. Further, it remains desirous to characterize volumes, sizes, shapes, and consistencies of wellbore objects based on captured images even in remote, dynamic, and harsh conditions.

It is with these issues in mind, among others, that various aspects of the disclosure were conceived. Also, although relatively specific problems have been discussed, it should be understood that the embodiments presented should not be limited to solving the specific problems identified in the introduction.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Aspects of the technology relate to object imaging and detection systems and methods for identifying objects in an object flow at various mechanical mud separation machines (MMSM) of an oil and gas wellbore operation. The analysis of an image includes detecting various features regarding object shape, size, type, volume, and other parameters of wellbore objects. Information from a rig, such as one captured by an electronic drilling recorder ("EDR") and associated software platform, may also be used in combination with image data to monitor rig health.

In aspects, the system uses a vision system comprising imaging devices (e.g., a digital camera), sensors, and other devices. The system may also detect and determine the presence or absence of objects using the vision system. Information from the object imaging and detection system, along with other information, may be used to provide real-time or near real-time information about the wellbore rig equipment. In aspects of the technology, the detection and imaging system uses artificial intelligence such as a deep neural network and/or machine learning to analyze image data (e.g., image data from a digital photo) of wellbore and rig equipment. In some examples, the analyzed image data may be used to flag anomalous objects, object flow, rig sensors and equipment, and/or rig environment.

Aspects of the technology include a computer-implemented method. The method includes receiving image data from at least one imaging device imaging at least one mechanical mud separation machine ("MMSM"), selecting, from the image data, at least one Region of Interest ("ROI"), analyzing, using a Deep Neural Network ("DNN"), the at least one ROI to identify at least one image aspect in the ROI, wherein the image aspect is at least one of an object in an object flow, signal noise, or another physical object, based on results from the analyzing operation, selecting at least one additional ROIs from the image data, analyzing the at least one additional ROIs using the DNN.

In examples of the method, at least one image aspect in the at least one ROI is an object in an object flow and the at least one additional ROIs comprises additional image data of the object in the object flow at a falling zone of a first MMSM of the at least one MMSMs. In examples of the technology the selecting operation comprises associating the at least one ROI with a first-time frame identifying the falling zone of the first MMSM; determining a second time frame and location within a field of view of the at least one imaging device at which the object will likely be present at a falling zone of an MMSM; selecting additional image data corresponding to the second time frame and location to form one additional ROI. In examples of the technology identifying a falling zone of the first MMSM comprises using a DNN. In examples of the technology selecting additional image data further comprises determining a size of the additional ROI to capture the entire object. In examples of the technology, the size of the additional ROI is 224×224 pixels. In examples of the technology the second time frame occurs earlier in time than the first time frame.

Aspects of the technology include a computer implemented method comprising receiving a field of view comprising image data from an imaging device capturing images of an MMSM; selecting, from the image data, a first ROI, wherein selecting the ROI includes: identifying a ledge of an MMSM within the image data, the ledge being a location where objects in an object flow begin to free fall; setting a top edge of the ROI at the ledge; identifying a frames per second of an imaging device capturing the image data; calculating a vertical length of the first ROI based on the frames per second of the imaging device and the ledge; associating the image data with a timestamp that corresponds to a time at which the image was captured by the imaging device.

In aspects of the technology the method also includes preprocessing the first ROI to form a preprocessed-first ROI. In aspects of the technology, the preprocessing comprises at least one selected from the group consisting of rotating the image data such that a ledge of the MMSM is substantially horizontally positioned, cropping the ROI to a specified pixel size, brightness equalization, and white balancing the image. In aspects of the technology, further comprising analyzing, using a DNN, the preprocessed-first ROI to identify a plurality of objects in an object flow; identifying, using a DNN, a first object in an object flow; and associating the object with a first-time stamp. In aspects of the technology, identifying the objects comprises at least one of estimating the object's size, shape, or color. In examples the method also includes analyzing, using a DNN, the ROI to identify a plurality of objects in an object flow; classifying each of the plurality of objects to form a plurality of classified objects; aggregating each of the classified objects into one or more groupings; determining the number of classified objects within each of the one or more groupings; comparing the number of objects within each of the one or more groupings to a threshold; based on the comparison, determining that an anomaly is present; and based on determining that an anomaly is present, sending a signal to begin capturing additional image data to an additional imaging device. In examples, the threshold is determined at least in part by signal data. In examples, the signal data comprises at least one selected from the group consisting of: a motor current, a temperature reading, a light meter, and a wind gage. In examples, the method also includes based on determining that an anomaly is present, sending a signal to the imaging device to change at least one image device setting selected from the group consisting of: a shutter speed, a frame rate per second, an aperture setting, and a resolution setting. In examples, the classified objects comprise cuttings and updating a cuttings transport model based on the classification of the cuttings. In examples, the classifying operation occurs at a different location from the receiving a field of view comprising image data operation.

Aspects of the technology include a computer-readable storage device storing instructions that, when executed, perform the method of receiving a field of view comprising image data from an imaging device capturing images of an MMSM; selecting, from the image data, a first ROI, wherein selecting the ROI includes: identifying a ledge of an MMSM within the image data, the ledge being a location where objects in an object flow begin to free fall; setting a top edge of the ROI at the ledge; identifying a frames per second of an imaging device providing the image data; calculating a vertical length of the ROI based on the frames per second of the imaging device and the ledge; associating the image data with a timestamp that corresponds to a time at which the image was captured by the imaging device.

In aspects, the storage devices include instructions that additionally performs the method of analyzing, using a DNN, the ROI to identify a plurality of objects in an object flow; classifying each of the plurality of objects to form a plurality of classified objects; aggregating each of the classified objects into one or more groupings; determining the number of classified objects within each of the one or more groupings; comparing the number of objects within each of the one or more groupings to a threshold; based on the comparison, determining that an anomaly is present; an based on determining that an anomaly is present, sending a signal to begin capturing additional image data to an additional imaging device. These and other aspects, features, and benefits of the present disclosure will become apparent from the following detailed written description of the preferred embodiments and aspects taken in conjunction with the following drawings, although variations and modifications thereto may be affected without departing from the spirit and scope of the novel concepts of the disclosure.

BRIEF DESCRIPTION OF THE DRAWINGS

The accompanying drawings illustrate embodiments and/or aspects of the technology. These drawings along with the written description, serve to explain the principles of the disclosure. Wherever possible, the same reference numbers are used throughout the drawings to refer to the same or like elements of an embodiment, and wherein:

FIGS. 9A and 9B illustrate one aspect in which an exemplary architecture of a computing device that may be used to implement aspects of the present disclosure.

DETAILED DESCRIPTION

Figure 1:
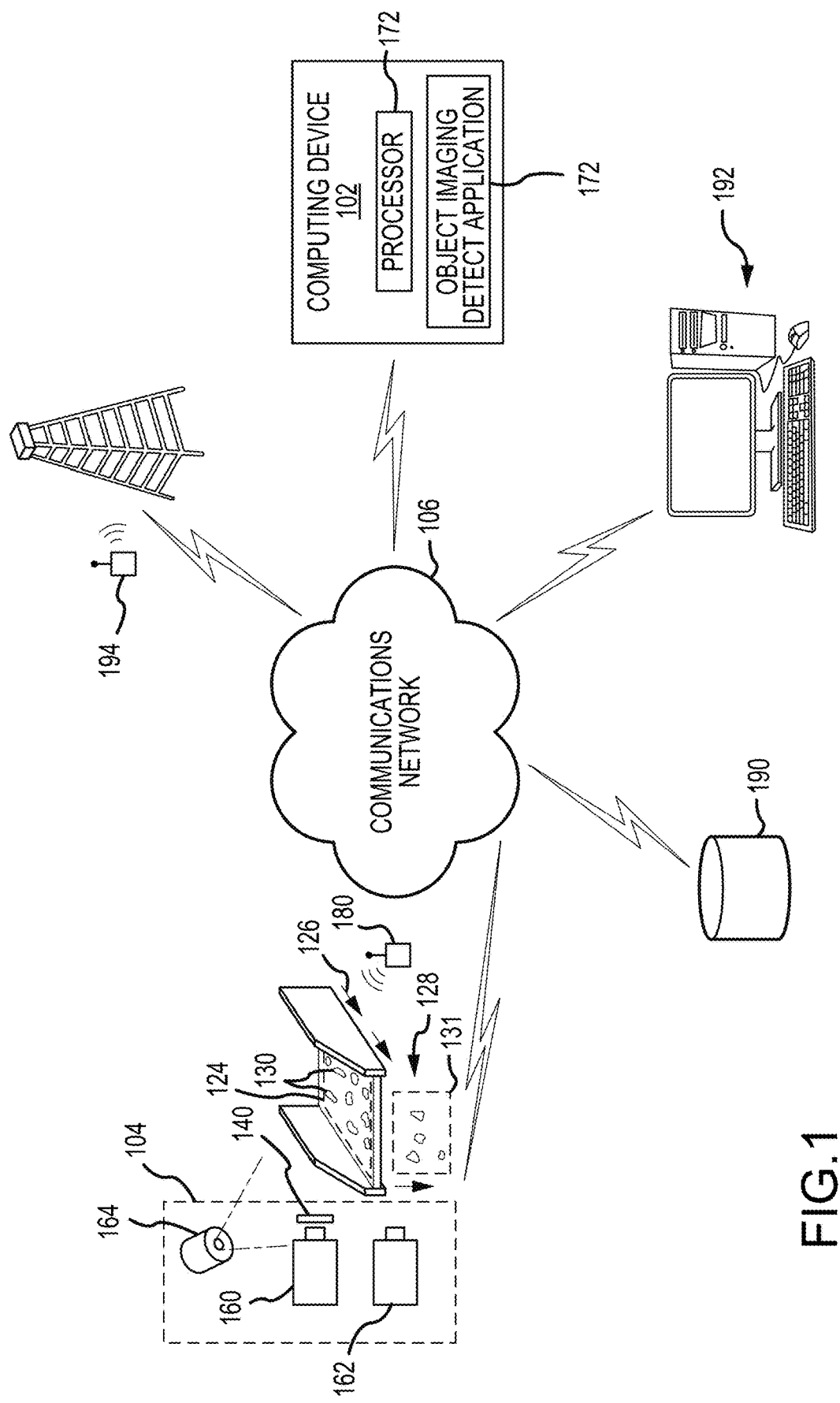
FIG. 1 is an example environment in which an object imaging and detection system of the instant disclosure may operate.

Aspects of the technology relate to computer-automated imaging systems and methods to capture, analyze, characterize, and/or identify objects in an object flow of a wellbore operation. In examples, the objects are identified using a Deep Neural Network ("DNN"). Additional image aspects may be analyzed, such as other physical objects in an image (e.g., a person).

For example, an imaging device, such as a camera, may be used to capture images of the return flow of one or more MMSMs. The imaging device may capture images of debris, cuttings, liquid, and/or other material of the object flow. The DNN may be used to analyze the image. Such analysis may include detecting and characterizing objects (such as mud cuttings) in the image. The cuttings may be automatically identified and determined. The characteristics of the object flow, such as object size distribution, object shape distribution, object color, object volume deviations and/or other parameters may be tracked over time and associated with the positional information of a drill bit in a drill rig.

Additionally/alternatively, the identified objects may be used to identify operational attributes of a wellbore. For example, the system may identify well productivity zones, well-hazard zones, fluid properties, wellbore hydraulics, equipment condition, and the like based on the identified wellbore cuttings and other information.

Aspects of the technology also relate to dynamically changing the image device settings, image type, image number, and image size/shape based on objects detected. For example, where object detection and classification indicates an anomaly, the system may automatically begin to capture and/or process more imaging information to confirm and or expand information related to these anomalies. One advantage of these aspects is that it allows processing speed and bandwidth to be relatively conserved when no anomaly is detected.

The information may be compressed, translated, or otherwise modified to facilitate communication to a location other than the location where the image was captured. For example, the image data may be compressed/translated such that the data can be transmitted from an off-shore drilling operation to an on-shore analytics and monitoring station relatively faster than sending all the imaging data. The real-time information may be presented to a drill team. The information may include flagged anomalies in the object characteristics and/or operational indicators. This information may be combined with other rig-based data to communicate one or more conditions associated with the rig equipment and/or the wellbore.

By applying automated, computer-based video interpretation, continuous, robust, and accurate assessment of many different phenomena may be achieved through pre-existing or real-time video data without requiring continuous manual monitoring. The technology described herein may be employed to improve performance across a wide range of video-based sensing tasks compared to the prior technology. For example, aspects of the technology may be used to improve safety, reduce costs, and improve efficiency.

The technology described herein may be used to capture images at one or more MMSMs. The captured images may contain objects in an object flow of an MMSM, other objects (such as people on the periphery of the image attending to the MMSM, the MMSM its, and equipment of the MMSM such as screens). The captured image may also contain image distortions due to interference with image capture, such as overexposure, signal noise, etc. The information captured by the image, or image aspects, may be analyzed using the technology described herein.

For example, an image may include objects in an object flow from a wellbore of a drilling rig. In the typical function of a drilling rig, fluid is pumped into the wellbore and back up the wellbore. As the fluid returns from the wellbore, it can carry with it solid material and semisolid material. This flow of objects is referred to herein as object flow. These objects may be predominately cuttings drilled by the drilling bit and are typically separated from the fluid using multiple mechanical mud separation machines including primary shale shakers, dry shakers, hydrocyclones, or centrifuges, among others. In addition to fluid or cuttings, other objects can include wellbore cavings, metal, rubber, cement, rubble, or tracers.

The object flow coming from the wellbore commonly passes into an MMSM which separates the debris from useable fluids/solids for re-introduction in a drilling operation. This separation process can occur one or more times and is accomplished by various devices such as shakers, dryers, centrifuges, and the processing pit. Often when such a separation process occurs, the object flow is split into at least one flow that is relatively drier and at least one flow that is relatively wetter. Multiple mechanical mud separation machines (MMSM) may be used in series or parallel to separate liquids from wellbore solids to facilitate liquid reuse. Typically, the first MMSM that encounters the returning object flow is the primary shale shaker which can have one or more screening tables. A shale shaker is the most common MMSM.

The shaker may include one or more screening decks, such as a top screening deck, one or more middle screening decks, and/or a bottom screening deck. Motors may also be attached to the shaker to impart vibratory motion on the shaker to assist with separating the object flow within the shaker as it transfers to another MMSM or waste pit. MMSM can be the dryer shaker, centrifuge, and hydrocyclones, among other devices. As further described below, imaging systems may be used with a shaker table but may also be used to image objects in an object flow of other types of MMSMs.

Aspects of the present technology may be used to improve on the manual observation techniques currently practiced. For example, automated detection of objects in an object flow and/or classification of wellbore/drilling/equipment condition based on captured images may be employed to reduce wellbore failure (such as cavings) and/or equipment malfunctions (e.g., metal). For example, the systems and methods described herein may be used to output likely well and equipment failures. In turn, such output may be used by well operators to improve efficiency, safety, and environmental impact during the drilling operation.

Figure 2:
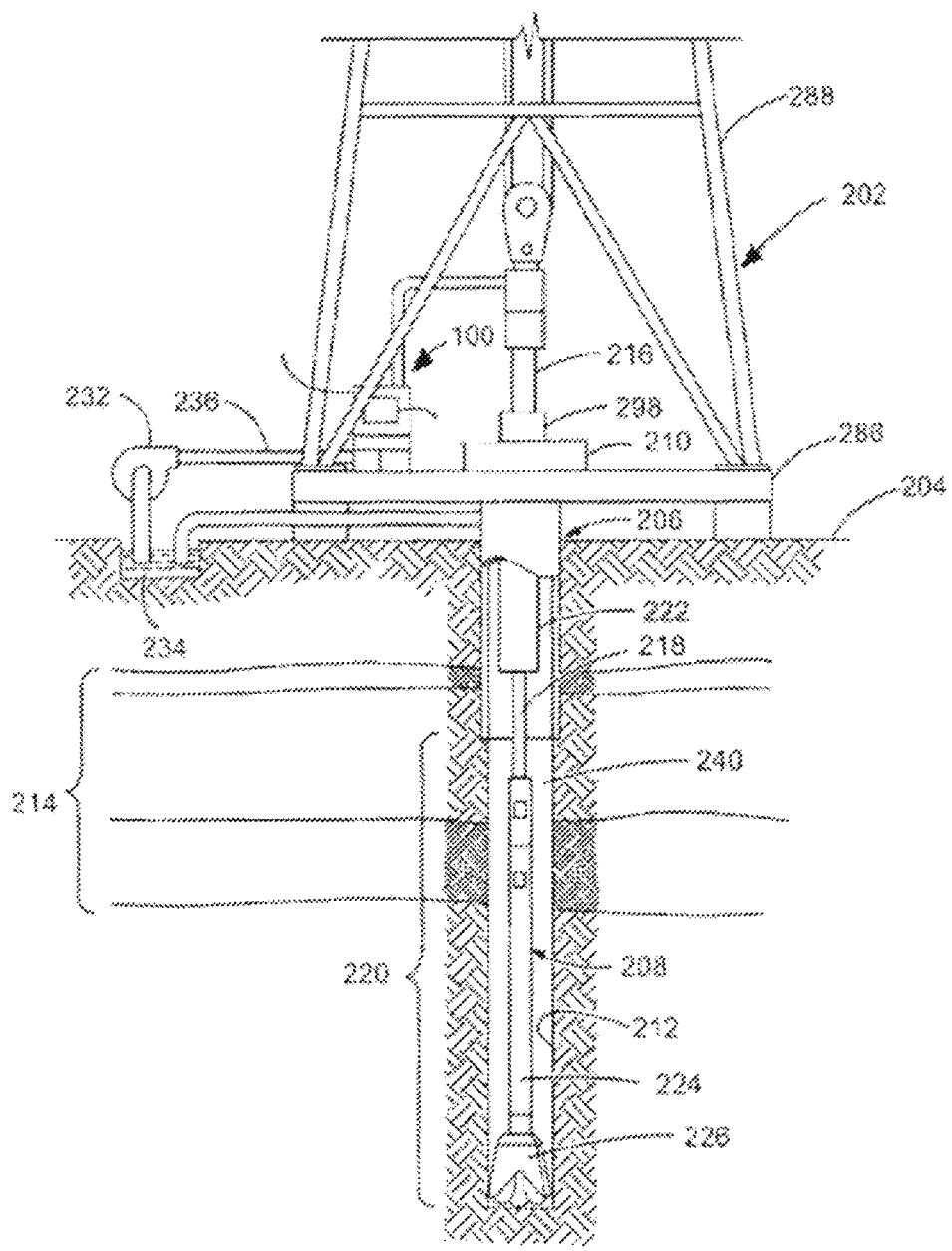
FIG. 2 is an example diagram of a wellbore associated with the object imaging and detection system according to an example of the instant disclosure.

Turning now to the figures, FIG. 2 provides an example of a drilling operation in which one or more aspects of the technology may be employed. FIG. 2 illustrates a drilling rig 202 that may be located at the surface 204 of a well 206. Drilling of oil, gas, and geothermal wells is commonly carried out using a string of drill pipes or casings connected to a drilling string 208 that is lowered through a rotary table 210 into a wellbore or borehole 212. Here a drilling platform 286 is equipped with a derrick 288 that supports a hoist.

As illustrated, the drilling rig of 202 provides support for the drill string 208. The drill string 208 may operate to penetrate the rotary table 210 for drilling the borehole 212 through subsurface formations 214. The drill string 208 may include a Kelly 216, drill pipe 218, and a bottom hole assembly 220, perhaps located at the lower portion of the drill pipe 218.

The bottom hole assembly (BHA) 220 may include drill collars 222, a down hole tool 224, and a drill bit or float equipment 226 attached to casings for cementing. The drill bit or float equipment 226 may operate to create a borehole 212 by penetrating the surface 204 and subsurface formations 214. The down hole tool 224 may comprise any of a number of different types of tools, including MWD tools, LWD tools, casing tools and cementing tools, and others.

During drilling operations, the drill or casing string 208 (perhaps including the Kelly 216, the drill or casing pipe 218, and the bottom hole assembly 220) may be rotated by the rotary table 210. In addition to, or alternatively, the bottom hole assembly 220 may also be rotated by a motor (e.g., a mud motor) that is located down hole. The drill collars 222 may be used to add weight to the drill bit or float equipment 226.

The drill collars 222 may also operate to stiffen the bottom hole assembly 220, allowing the bottom hole assembly 220 to transfer the added weight to the drill bit and in turn, to assist the drill bit in penetrating the surface 204 and subsurface formations 214.

During drilling and pumping operations, a pump 232 may pump fluids (sometimes known by those of ordinary skill in the art as "drilling mud," "cement," "pills," "spacers," "sweeps," "slugs") from a processing pit 234 through a hose 236 into the drill pipe or casing 218 and down to the drill bit float equipment 226. In operation, the fluid may flow out from the drill bit or float equipment 226 and be returned to the surface 204 through an annular area 240 between the drill pipe or casing 218 and the sides of the wellbore borehole 212. The fluid may then be returned to the processing pit 234, where such fluid is processed (e.g., filtered). In some embodiments, the fluid can be used to cool the drill bit 226, as well as to provide lubrication for the drill bit 226 during drilling operations. Additionally, the fluid can be used to cement the wellbore and case off the sub-surface formation 214. Additionally, the fluid may be used to remove other fluid types (e.g., cement, spacers, and others), including wellbore objects such as subsurface formation 214 objects created by operating the drill bit 226 and equipment failures. It is the images of these objects that many embodiments operate to acquire and process. The drill rig, equipment, and bit, and other devices may be equipped with various sensors to monitor the operational performance of the rig. This information may be sent to a computer system, such as an electronic drill recorder (EDR).

FIG. 1 is an example environment 100 in which an object imaging and detection system of the instant disclosure may operate. Those skilled in the art will understand that while environment 100 illustrates a vision system 104 employed at one MMSM, the vision system 104 may be employed at additional MMSMs. Indeed, vision system 104 may be employed at multiple rig sites to solve problems associated with image capture at MMSMs. For some applications, a single, high-definition imaging camera with a large field of view captures all image data as a video, and one or more ROIs are selected from the image data. In such applications, each captured frame may be associated with a time stamp. In examples, the imaging device is located above an MMSM and images the output flow from the MMSM. Additionally/alternatively, the imaging device captures multiple MMSMs.

Environment 100 includes image vision system 104, capturing images having two regions of interest ("ROI"), namely a first ROI 124 and a second ROI 131. ROIs are areas within a field of view of an imaging device that are selected for image analysis, such as by object detection using a DNN as further described herein. There may be one or more, such as two, three, four, five, etc., ROIs within a field of view. In aspects of the technology, an ROI is a portion of a captured image (e.g., the portion may be of a certain size within a field of view). Further, the portion of the ROI may be consistent over a period of time. In such cases, the image data captured within the ROI may be associated with a time stamp corresponding to the time at which the image data was captured.

In some examples, image vision system 104 has one or more imaging devices. It will be appreciated that a single imaging device may be used to capture a large field of view from which one or more multiple ROIs may be selected. As illustrated, the image vision system 104 has a first imaging device 160 and a second imaging device 162. Imaging devices, such as first imaging device 160 and second imaging device 162, may be any device suitable to capture images of objects in an object flow, including objects flowing through an MMSM. Such imaging devices include charge couple device (CCD) cameras, Complementary Metal Oxide Semiconductor cameras, high-resolution cameras, visible light cameras, low light or infrared cameras, and/or LiDAR imaging devices. In some applications, the vision system 104 may capture 3D profiles of objects in an object flow using one or more imaging devices that relate to LiDAR, stereo cameras, ultrasound sensors, or electromagnetic waves sensors, and/or other imaging devices now known or later developed capable of capturing 3D images.

Also illustrated is an additional light source 164. In aspects, one or more additional light sources 164 illuminates objects in an object flow (or other objects in an field of view), such as object flow 126. A light source may be an ultraviolet light, an incandescent light, a white light, tungsten light, infrared light, or light-emitting diodes (LEDs) to illuminate wellbore objects. The light source may be capable of generating various types of light, including near, mid, or far wave infrared lights, the visible spectrum, ultraviolet like, and the like.

The vision system 104 is illustrated in network communication with a computing device 102. In aspects of the technology, the vision system 104 may transmit real-time information from imaging devices including ROIs. In some aspects of the technology, the entire field of view is sent to a computing device 102 and/or a storage device 190. In other aspects, only the ROI is sent to the computing device 102 and/or the storage device 190. The image information may include wellbore object image information. The computing device 102 may be configured to process the image information. Such processing includes automatically identifying/classifying wellbore objects, other objects, in the image as further described herein.

It will be appreciated that various ancillary devices may be employed with image vision system 104 without deviating from the scope of the innovative technology. For example, various lenses, filters, enclosures, wipers, hoods, lighting, power supply, a cleaning system, brackets, and mounting devices may comprise image system 104. Further, one or more of a mechanical camera stabilizer, a camera fog stabilizer, or the like may be employed. Image system 104 may be designed to operate in outdoor, harsh, all-weather, hazardous areas, and/or 24 hours per day. The enclosure and its components may be watertight, explosion-proof, and/or intrinsically safe.

Vision system 104 also includes modification device 140. In examples, a modification device may be employed to modify/reduce/focus the light (e.g., infrared/visible light/ ultraviolet light, etc.) captured from the objects in the object flow. For example, modification device 140 may be one or more of polarizers, filters, and/or beam splitters to intercept light reflected or emitted by the wellbore objects, such as well bore objects 130, and to reduce the amount/type of light received by the imaging devices of the vision system 104.

For example, the modification devices 140 may be chosen based on the type of drilling fluid that is used. Polarizers can be used to align light energy in either the P or S directions (so that the processed energy is p-polarized, or s-polarized), or to give a blend of P and S polarized energy. Beam splitters can be used to reduce the spectrum of the received energy to some selected range of wavelengths. Filters can be used to further narrow the range to a select spectrum prior to image capture.

Additionally/alternatively, one or more modification devices 140, may be interposed between the objects 130 and/or the object flow 126 and the vision system 104 to reduce the number of wavelengths captured by the vision system 104. In examples, the reduction in wavelengths allows fluid and objects that may be in close proximity to other objects to become relatively transparent, so that the objects in the object flow are more prominently captured by the image devices of the vision system 104.

The energy modification devices may be adjustable to obtain a relatively strong image contrast for detection of the objects 130 within a fluid solution that has a dynamic composition. The selection of materials used in conjunction with the energy modification devices may depend on the hazards of the environment, including the chemical solutions present. These materials may include glass, polymers, and metals, among others.

In aspects of the technology, the images captured by vision system 104 include one or more ROIs. As illustrated, environment 100 includes a first region of interest 124 and a second region of interest 131 The regions of interest may be selected to be a particular area of the MMSM, such as a falling zone of a shaker table or the entire MMSM. One or more ROIs may be selected and analyzed by an Object Imaging and Detection System 172 to identify image aspects, including identifying objects in an object flow and identifying other objects in the ROI. Such identification may occur using a DNN. The region of interest may be automatically selected by the Object Imaging and Detection Application 172 as further provided herein. Further, though FIG. 1 illustrates identifying an ROI contemporaneous to the imaging devices capturing the image, it will be appreciated that an ROI may be determined after the image is captured. Such determination may be applied to historical data stored in a database, such as database 190.

Environment 100 may have one or more environmental sensors 180 as part of the vision system 104 to aid in image rendering. The sensors may be used to detect the environment of the image capture area. For example, a first imaging device 160 may capture a portion of an MMSM that is experiencing a vibration due to the operation of the MMSM. The vibration rate may be captured by the one or more environmental sensors 180 and be automatically associated with the images captured by the imaging device at the time of capture. The environmental sensors 180 may capture other environmental factors, such as MMSM operation speed, load, light, and others. The data captured by environmental sensors 180 may be used to change/alter the selected ROI.

As a particular, non-limiting example, additional environmental sensors 180 may be used to detect additional operational conditions and equipment states by measuring different physical parameters and analyzing in a parallel process or combined with data issued from the optical analysis. Real-time series data may be collected from additional sensors around the shaker and correlated with data resulting from optical measurements to validate and enhance the resulting metrics and states of the process and the equipment.

An example of additional physical parameters is vibration measurement using a piezoelectric sensor or accelerometer. Vibration of the shaker, or the surrounding frame, is, for some applications, impacted by the nature and the size of the load processed. The mass of the rocks and the fluid viscosity have a direct impact on the behavior of the solid and fluid traveling on the shaker screens in relation to the energy transmitted with the vibrating motors. The movement frequency and amplitude, the angle of the shaker, and the impact on the process may result in a very specific vibration signature that may be correlated to the data captured using the imaging device. Load cells and strain gages may also be used as sensors which will also better expose the load distribution on the shaker screens.

Another example of physical parameters is the acoustic resulting from the combination of the shaker operation and the combination of fluid and solid being processed. Acoustic sensors may be a microphone, piezoelectric or pressure sensor embedded in an imaging device, or an additional sensor. The properties of the solids and the fluid, all traveling on the shaker screens, as well as the operating conditions of the shaker, may be sampled to create a specific acoustic signature that may be correlated to a specific state and condition. Also, special state and conditions, like usage of pressure washers or worn screens, may be captured to generate specific acoustic signatures that can be correlated to the data resulting from the image capture.

Another example of physical parameters is the electric current of the shaker's electrical motor. The electrical current, measured at a sampling rate faster than 1 KHz, may show the impact of the physical equipment connected to the motor shaft. When the load or the behavior of the load varies, this may result in an acceleration or deceleration of the shaft and rotor of the electric motor in certain applications. These variations will have a direct impact on the electrical current passing through the electrical motor in certain applications. Using Motor Current Signature Analysis (MCSA), a continuous electrical current signature may be generated and associated with the data resulting from the image capture.

In aspects, a primary element may provide an analog signal that passes through an analog-digital converter (ADC) and is sampled at a rate faster than 1 KHz. Data may be time-stamped and becomes a time series. The data may then be converted to the frequency domain by FFT and Wavelet to reduce data volume and density while maintaining information content. The frequency-domain signature over time may then be stored and correlated to data resulting from the optical inspection to improve generated metrics dimension, accuracy, and robustness.

Environment 100 also includes drill rig devices 194. Drill rig devices capture and transmit information related to downhole BHA tool or rig equipment, including the depth and positional information of the drill bit, Gamma Ray readings, wellbore volume, and pump flow rate during a drilling operation. Additionally, various wellbore attributes, such as wellbore depth and volume, may be determined using vision system 104 and computing device 102. For example, a tracer may be injected at the wellbore. These BHA or injected man-made tracers may be captured in an image. The portion of the image that includes the tracer may be selected as an ROI after the tracer has traveled from the wellbore to an MMSM site equipped with a vision system 104. This information may be sent via the network 106 to the computing device 102 for handling by the object imaging and detection application 172. Information from the drill rig devices 194 and the environmental sensors may be captured by an EDR.

The communication network 106 is used to allow communication between the various elements provided in environment 100. Network 106 may be the Internet, an intranet, or another wired or wireless communication network. For example, the communication network 106 may include a Mobile Communications (GSM) network, a code division multiple access (CDMA) network, $3^{rd}$ Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

As illustrated, environment 100 also includes a computing device 102 having a processor 170 and an object imaging and detection application 172. The computing device 102 may run the object imaging and detection application 172. The object imaging and detection application 172 may send and receive information through a network, such as network 106. This information may include data and information from the image vision system 104 (including ROI and image data), environmental sensors 180, and the well status devices 194, as well as other information of the environment 100 (collectively, the System 100 Data).

The System 100 Data and other information may be used by the object imaging and detection application 172 to perform a variety of functions. For example, the object imaging and detection application 172 may use the System 100 Data to select or change an ROI, which forms a part of the images captured by the imaging devices illustrated in FIG. 1. Additionally, the object imaging and detection application 172 may apply various digital rendering techniques to preprocess the image data based on environmental sensors data, along with other System 100 Data, to prepare the image for identification of the wellbore objects. Additionally, the object imaging and detection application 172 may identify wellbore objects, such as wellbore objects 130. Identification of wellbore and other objects may be performed using a DNN. The object imaging and detection application 172 may analyze System 100 Data to classify regions of the well based on safety and or productive regions. The object imaging and detection application 172 may also analyze the System 100 Data to determine the current and historical operational status of the rig and/or wellbore. Additionally, the object imaging and detection application may alter and/or compress any of the System 100 Data to transmit such data over a low bandwidth network.

Environment 100 also includes one or more servers 192. In aspects of the technology, the object imaging and detection application 172 may interact with a remote user via the server 192. Such interaction may include sending information to a remote user regarding the wellbore state, classified objects in an object flow, warnings, safety alarms, operational parameters, and the like, as described further herein. The server may facilitate interaction with the computing device 102, the vision system 104, the first imaging device 160, the second imaging device 162, and other sensors and instrumentation of the environment 100. Such interaction may be via a client and/or a web browser.

As illustrated, a storage device 190 is in electronic communication with the one or more computing devices 102, a server 192, and the vision system 104. The storage device 190 may be used to store acquired image and computational data, as well as other data in memory and/or a database. For example, the storage device 190 may store images captured by imaging devices along with associated data, such as the time of capture. Further, sensor data and other information may be associated with the image in a relational database or other databases. The object imaging and detection application 172 may retrieve such stored data for a variety of purposes. For example, as described further herein, the object imaging and detection application may set new ROIs on an image that was captured in the past. The Object Imaging and Detection Application 172 may use image data stored on the storage device 190 to retrieve the historical image and/or a portion of the historical image data, including historical image data associated with the newly set ROI.

It should be appreciated that the computing device 102 may be located remote from the MMSM and acquire data passively without interaction with the MMSM. In applications, the overall quality, accuracy, and precision of the data output may be enhanced by additions and or modifications to the MMSM equipment operational area, such as illumination, illumination control, and weather shielding.

In addition, modifications to the MMSM may provide further enhancement to image capture. Examples include the installation of a known and consistent background field of view of an imaging device. The introduction of indicia on the MMSM equipment with known dimensions and or locations may be used, which, for certain applications, assists with ROI location or generation, calibration, size determination, and image processing operations such as warp or skew. The output of the MMSM could be modified to better separate and or clarify object flow, for example, to output larger particles farther out directly in the view of a vision system 104. The MMSM equipment may receive additional sensing equipment, e.g., vibration, current, and or acoustic instrumentation. Data from this equipment and instrumentation may be sent via a network to computing device 102.

Figure 3:
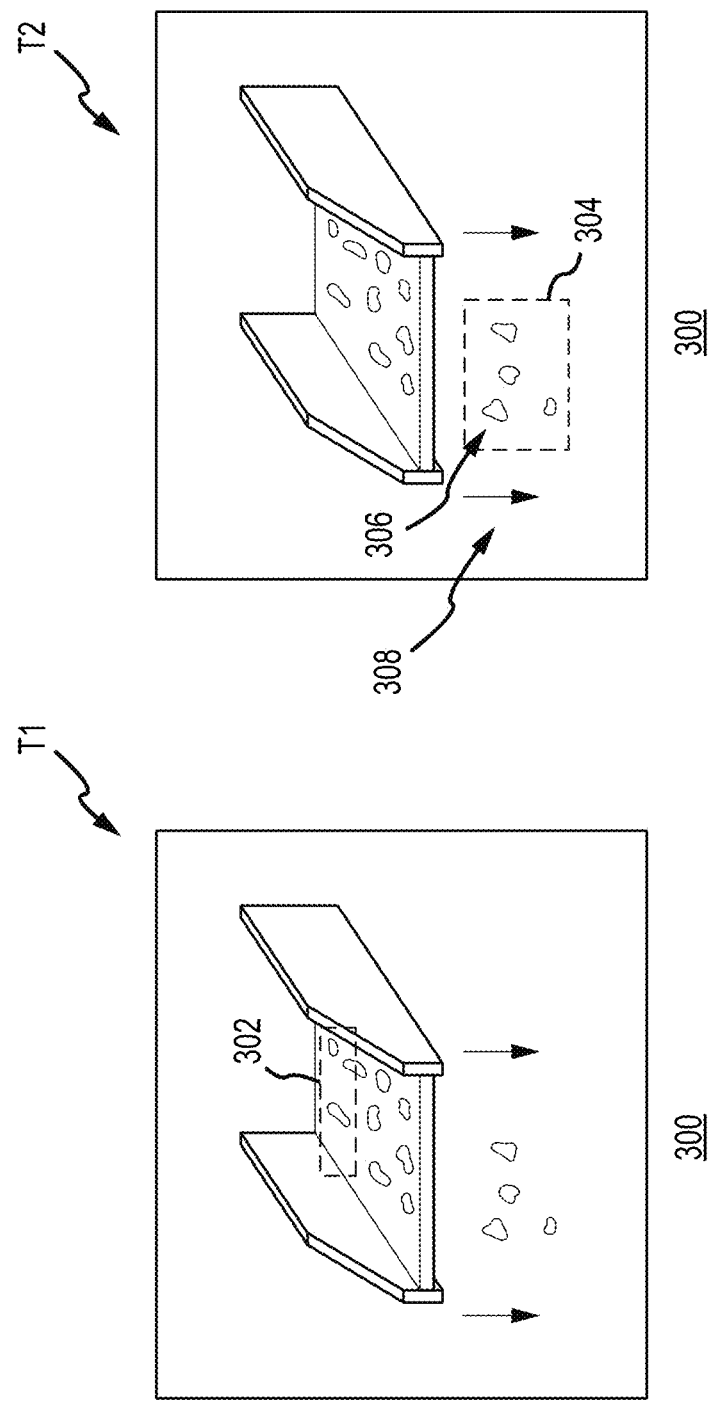
FIGS. 3A and 3B illustrate examples of regions of interest.

FIGS. 3A and 3B illustrate an example change in an ROI of a field of view 300 between a first time (T1) and a second time (T2). In examples, the field of view 300 is captured by a single camera. Field of view 300 may be the entire field of view of an imaging device, which may be the same as or similar to the imaging devices described with reference to FIG. 1. FIG. 3A illustrates a first region of interest 302 in a field of view 300 at time T1 and a second region of interest 304 in the field of view 300 at time T2 on an image capture device 306.

In aspects of the technology, an object imaging and detection application, such as the object imaging and detection application 172 described herein, dynamically determines a new region of interest within one or more fields of view from a first-time T1 and a second, later time T2. In other examples, T2 occurs before T1. For example, where an object of interest is detected downstream, an object imaging and detection application may access historical image data that includes an upstream, earlier in time ROI. Such access may occur by the object imaging and detection application accessing a networked database, such as database 190.

In aspects of the technology, the ROI 302/304 size and or shape is determined by one or more computing devices based on the direction and velocity of an object in an object flow. For example, ROI 304, which illustrates an ROI 304 including objects 306 falling in a falling zone 308 of an MMSM, may be sized and shaped such that the image captures the entirety of at least one object through fall. In some aspects where the object is traveling at a high velocity and/or acceleration, the ROI may be vertically taller to capture the entire object in an object flow than would be needed if the object were stationary. This may occur, for example, where the imaging device was at a resolution/shutter speed that caused an object to appear longer (because of imaging distortion, e.g., streaking of the image) than would have appeared had the object been stationary.

It will further be appreciated that the field of view may be captured in real-time relative to the setting/analysis of the first ROI 302 and the second ROI 304. It will also be appreciated that the image capture may occur in the past relative to when an object imaging and detection application, such as object imaging and detection application 172, is setting/analyzing a region of interest. In aspects of the technology, the object imaging and detection application 172 identifies an anomaly, such as an object of interest, and the object imaging and detection application 172 may set a new ROI at T2. The object imaging and detection application 172 may set the new ROI by identifying a region that may be easier to identify objects in an object flow. For example, the new ROI may be in an area of an object flow that is drier and/or slower. It will also be appreciated that the selection of a new ROI may change from one ROI to many ROIs, and from many ROIs to fewer ROIs as determined by an object imaging and detection application as further described herein.

Additionally, the settings of an imaging device may be changed to assist image capture and/or change the ROI. For example, the shutter speed, exposure, resolution, and gain may be adjusted to account for velocity, illumination level, or other conditions. Where velocity and/or illumination are higher, shutter speed may be increased to allow for a relatively smaller field of view to be used. For certain applications, a smaller ROI is desirous because, among other factors, smaller ROIs tend to need less processing time and processing power and require less network bandwidth to transmit than larger ROIs, assuming all other parameters are equal.

Figure 4:
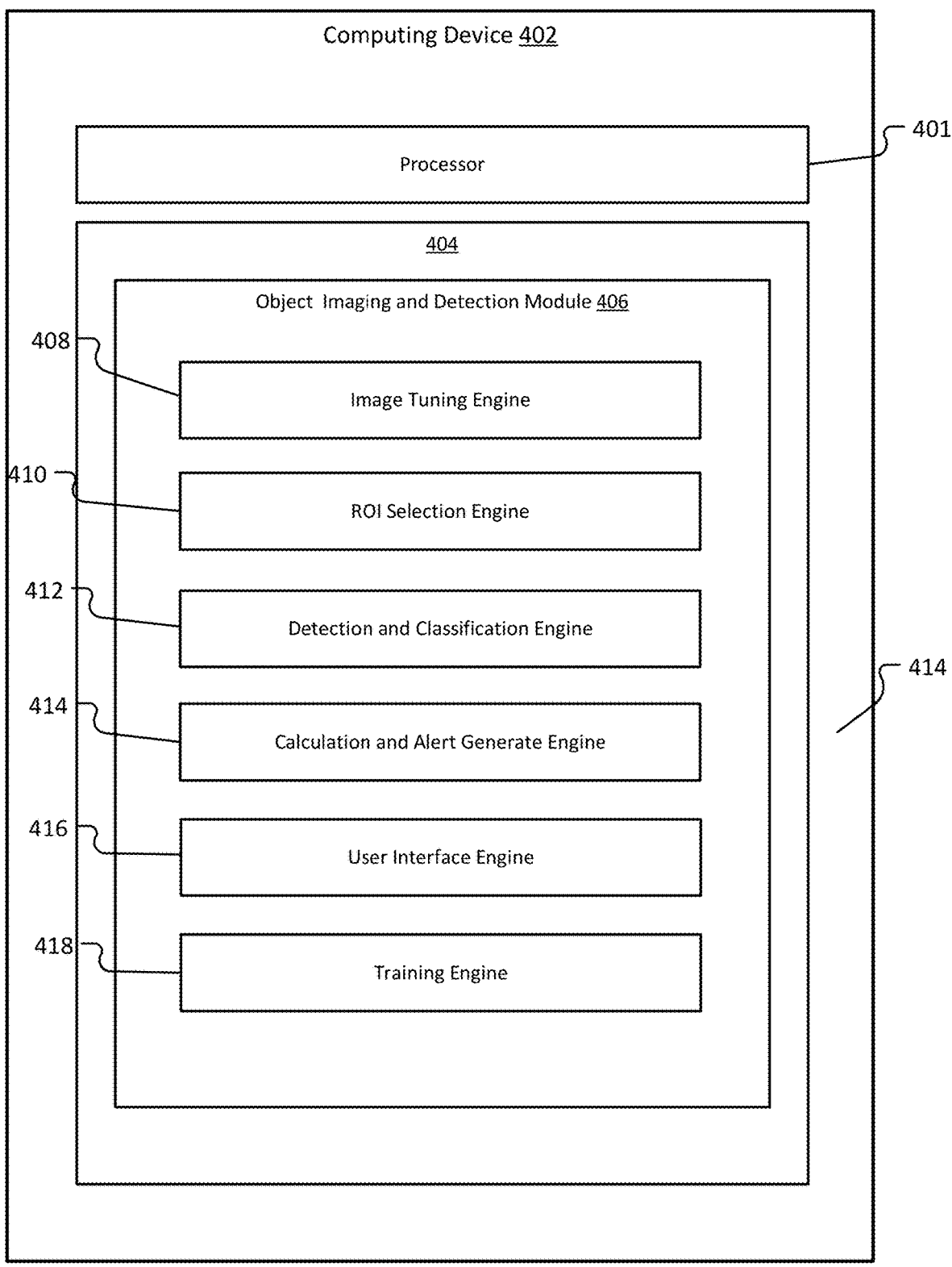
FIG. 4 is a block diagram of a computing device having an object imaging and detection application according to an example of the instant disclosure.

FIG. 4 illustrates a block diagram of the computing device 402 according to an example embodiment having a processor 401. In aspects of the technology, the computing device may be the same or similar to the computing device 102 described with reference to FIG. 1. As illustrated, the computing device 402 includes computer-readable media (CRM) 404 on which an object imaging and detection application 406 is stored. The object imaging and detection application 406 may be the same as or similar to the object imaging and detection application 172 described with reference to FIG. 1 above.

In examples, the object imaging and detection application 406 includes various engines that perform various functions related to receiving image data, environmental, and wellbore device data related to MMSMs, processing such image data, identifying objects captured within the image data, automatically adjusting one or more ROIs based on the received data, identifying and storing operational and productivity parameters of a well bore and rig based on the received data, and the like.

Imaging device tuning engine 408 uses various factors to set parameters of one or more imaging devices. Such imaging devices may have the same or similar properties as described above. The imaging device tuning engine 408 may send and receive signals via a network. The signals may be control signals to cause the tuning engine to change one of a shutter speed, an aperture, a resolution, and/or a gain associated with the one or more imaging devices. Additionally, imaging device tuning engine 408 includes determining whether to turn on/off and or begin capturing images.

In aspects of the technology, the image tuning engine 408 uses environmental factors from a drill operation when setting parameters of the one or more imaging devices. For example, the image tuning engine 408 may receive information regarding environmental factors from one or more sensors, such as environmental sensors 180, a light source 164, a drill rig sensor 194 and/or other information. The information may be transmitted via a network, such as a network 106. Additionally, the image tuning engine 408 may receive information that events/objects of interest are occurring at other devices, which may trigger the control system to turn on the device and/or begin capturing/storing image data.

To provide specific, nonlimiting examples, the amplitude and frequency signals captured by one or more sensors relating to motors (indicating motor speed, for example), flow rate detectors, or other operational indicators indicating an operating environment that may affect image capture may be used to automatically adjust various settings of one or more imaging devices. Additionally, signals may be transformed into image data and analyzed by the DNN, which analysis may be output to the image tuning engine 408 to change the parameters of an imaging device.

System 400 includes an ROI selection engine 410. ROI selection engine 410 handles determining the size, shape, and location of one or more ROIs. The selected one or more ROIs are then sent to the Detection and Classification Engine for further processing as described herein. The ROI selection engine 410 may use real-time captured image data to select an ROI. Additionally/alternatively, archived/historical image data may be used to select additional ROIs.

The size, shape, and number of ROIs is determined by a variety of factors. For example, the image device settings may influence the size of the ROI. In some examples, an imaging device may be set to a low shutter speed and/or low resolution such that a greater ROI is necessary. Environmental factors, speed of or presence of object(s) in an object flow, and other data may be used to determine the size of an ROI.

Additionally, the number of ROIs within a field of view and/or the number of ROIs across multiple fields of view may be determined using information received from the detection and classification engine 412. Also, a change/additional ROI may be determined by the ROI selection engine 410 based on a number of factors, including clarity of currently selected ROI, increased/decreased objects of potential interest in a current ROI, type of object detected in current ROI, speed/acceleration of object detected in the current ROI, and the like.

For example, where objects and or events of interest are detected, the ROI selection engine may determine to select additional ROIs for analysis. The ROI selection engine may receive information indicating that a current region of interest is in a wetter zone (e.g., screen of a shaker table) and an object captured in the wetter zone is of interest. The ROI selection engine may select additional ROIs from a different field of view (e.g., a different imaging device) or the same field of view and identify the object in a different section of the object flow. That section, for example, may be a relatively drier section, which, in examples, allows for easier classification by a detection and classification engine. If the sensor determines that an ROI is of abnormal or anomalous conditions (e.g., objects in object flow are too wet and/or clumpy to analyze), a new ROI may be selected, where the new ROI is selected to track an object beyond the initial ROI. For example, it may choose other ROIs 110 at a time and place along the object flow corresponding to the likely position of the object of interest. The likely position may be determined by the estimated travel of the object moving in the object flow (e.g., based on velocity, acceleration, fluid-flow dynamics, etc.). A position may be selected based on a preferred downstream location (e.g., another MMSM) and the likely time/position of the object of interest.

ROI selection engine 410 may select an ROI to identify issues with separation. For example, where the object flow is in contact with the mechanical separating device, an ROI may be selected to analyze the degree of contact between the object flow/objects and the separating device. Another example is where the screen of the MMSM has become worn and object flow is affected. This may be of interest and can be affected by various factors, including velocity, table angle, flow, design of the separator, sizes of particles in the object flow, liquid content, and energy being imparted by the separator device to the object flow, etc.

A detection and classification engine 412 receives image data for analysis of the image data. In aspects, the detection and classification engine preprocesses image data 412 in preparation for classification by a DNN. Image data may be an entire field of view of a camera and/or just one or more regions of interest of the field of view. In additional/alternative aspects of the technology, various environmental signals (e.g., vibration, motor electrical current, and acoustic signals) may be passed through a wavelet filter and imaged for classification. In aspects of the technology, the detection and classification engine uses a DNN to analyze the ROI to determine one or more image aspects in ROI interest. The image aspects may include objects of an object flow, other objects, and/or signals that have been passed through a wavelet filter to generate an image classification by a DNN.

In aspects of the technology, DNN's are based on a series of visible and hidden layers conducting functions like convolutions to extract the features of an image. In examples, features are properties and visual characteristics of an image as identified by the neural network. In examples, the structure of the DNN includes many hidden layers built of multiple nodes that are connected to all nodes from the previous and the next layer. When training a model, the neural network is tuned by adjusting the gains (weights) used to connect all the nodes from one layer to another until the loss is at a minimal level. The loss is determined by comparing the result of the neural network with a reference like the labels of the images. In aspects, labels represent the whole image (classification) or the location and the nature of a specific region (object detection).

DNN models are available for re-training (mobilenetv2, YOLO, etc. . . . ), which means the DNN is structured in a way that it knows how to efficiently extract and organize the features found in an image. These models allow, in examples, customization of the last layers where the training process tunes the connecting weights between the features extracted and how they relate to trained conditions and objects. The training algorithm may use metadata attached to the training images that have been captured or validated by a human.

In aspects of the technology, the DNN is trained using a dataset with tagged objects. For images comprising signals transformed using a wavelet filter, the tag may include operational parameters such as evidence of failure, evidence of vibration, etc. In aspects of the technology, the training process includes a data augmentation mechanism based on spatial augmentation, color space augmentation, and image blur. Further, the deep neural network may be trained for object detection and tracking based on a custom dataset of objects potentially found on a screen shaker. In examples, the DNN may be one or more of SSD, DSSD, DetectNet_V2, FasterRCNN, YOLO V3, YOLO V4, RetinaNet. The following training model can be used based on the installation: ResNet 10/18/34/50/101, VGG16/19, GoogLeNet, MobileNetV 1/V2, SqueezeNet, DarkNet, SCPDarkNet, EfficientNet.

The output from detection and classification engine 412 may be a list of identified objects, type of objects, number of objects, events (e.g., screen change out, wash cycle, excessive vibration), relative location (e.g., within various channels of a shaker table location), and/or size of the ROI. In aspects, a sub-image of each object detected is processed a second time to determine the exact contour using digital filters and correct the measured area data. A blob detection method may be used to detect regions in the zone of interest and compare those with the total area from the deep neural network. This may be used to confirm inspection performance and % hit. Static known objects or events in the field of view may be trained and part of the resulting inventory to monitor the health of the system 100.

Classification of objects in an object flow relates to wellbore objects in examples. It will be appreciated that a DNN may be trained to classify objects in an image in various ways. Examples include classifying objects as a cutting, a caving, a fluid, a tracer, rubble, debris, metal, plastic, rubber, etc.

In aspects of the technology, the detection and classification engine 412 may also perform unknown object detection. A DNN may return an object with low probability. Additionally, unknown objects may be detected using a combination of edge detection filters, blob detection method, and shape detection using a deep neural network to detect an object's shape. It may also include comparisons with a total area and the list of detected objects of an object shape inventory. Unknown object images may be saved for further training. Performance indicators may be generated to warn about unknown objects being detected.

The calculation and alert generation engine 414 aggregates information from the detection and classification engine 412 and other information from an imaging system, such as system 100, and calculates and/or determines deviations from setpoints and data ranges. Based on those deviations, the calculation and alert generation engine 414 outputs audible and/or display indicators in examples.

Data may be collected from various sensors, devices, and computing devices, such as System 100 data, to augment the information coming from the detection and classification engine 412. As a non-limiting example, the number of a particular object, as classified by the detection and classification engine 412, may be aggregated and associated with a time stamp. In some instances, the object information may also be associated with environmental factors, such as the positional information of a rig.

In some aspects of the technology, the calculation and alert generation engine 414 determines deviations from a setpoint using the collected data, the information from calculations and alert generation engine 414, and/or predetermined set points. For example, the rate of detection of an object, change in the frequency of detection, the acceleration of change, or other metrics may be analyzed using the aggregated information. This aggregation may be compared to a preset value. The preset value may vary and/or change based on a variety of factors, including System 100 data. When the calculation and alert generation engine 414 deviates from one or more preset values, then the alert generation engine may send output to a display, audible device, haptic device, or other devices to alert a user of the system that a potential error has been detected.

The calculation and alert engine 414 may also perform other calculations using the captured images. For example, when tracers are used, the depth and wellbore volume (diameter) may be determined as further described with reference to FIGS. 12-14.

Table 1 below provides operational indicator examples that may be identified by the calculation and alert generation engine 414.

TABLE I

| Wellbore Object | Description | Operational Indicators |
|---|---|---|
| Cutting | Rock generated from drill bit (BHA) from cutting action | Cutting characteristics including size, shape, color, and volume |
| Cuttings - Size | BHA generated, influenced by bit, hydraulics, and time in annulus Baseline for normal operations. Presence, absence, or deviation indicates grinding, BHA dulling, inadequate wellbore hydraulics, equipment failure | Cutting size reduction caused by low pump rate increases the time spent in the hole and is thus subject to more grinding by the BHA. Cutting size reduction caused by inadequate hydraulic horsepower causes the cuttings to be redrilled by the bit Cutting size indicates how long it has remained in the well. Larger cuttings will be less ground and indicate efficient removal. Smaller cuttings are more pulverized due to their longer travel time inside the wellbore A sudden increase in size could be an indicator of cavings. |
| Cuttings - Shape | BHA generated, influenced by bit, hydraulics, and time in annulus | Baseline for normal operations. Presence, absence, or deviation indicates grinding, BHA dulling, inadequate wellbore hydraulics, equipment failure A change in shape could be an indicator of cavings or grinding, BHA dulling, inadequate wellbore hydraulics, equipment failure |
| Cuttings - Color | BHA generated, influenced by formation type | Baseline for normal operations. Depth and geological formation location, deviation indicates formation lithology change |
| Cuttings - Volume | BHA generated, Formation and operations influenced | Baseline for normal operations. Presence, absence, or deviation indicates changes in rate of penetration, wellbore geometry, and inadequate wellbore hydraulics A sudden increase in volume could be an indicator of cavings. |
| Caving | Rock generated by instability in formation stresses as the wellbore is penetrated by the BHA. It is not generated by the BHA like cuttings. | Cavings have unique characteristics including size, shape, color, and volume |
| Cavings - Size | Formation generated, influenced by earth stresses and fluid rheology, hydraulics, and time in the annulus | Baseline for normal operations. Presence, absence, or deviation indicates an over gauge hole, influx, and wellbore instability. A degree of cavings is acceptable but does impact hole cleaning efficiency |
| Cavings - Shape | Formation generated, influenced by earth stresses and fluid rheology, hydraulics, and time in the annulus | Above + identify formation failure type and corrective action |
| Cavings - Color | Formation generated, influenced by lithology | Above + formation type |
| Cavings - Volume | Formation generated, influenced by earth stresses and fluid rheology | Baseline for acceptable amount, deviation indicates influx, changes in formation stress, severity of instability effects hole cleaning and potentially leading to stuck pipe |
| Fluid | Degree of liquid in ROI not on rocks | Shaker (MMSM) overflow, flow diverter controlled, screen size, vibration force, centrifugal force, settling time |
| RFO | Retained Fluid on Object | MMSM performance, dryness inside the waste pit (slurry density) |

TABLE I-continued

| Wellbore Object | Description | Operational Indicators |
|---|---|---|
| All Objects | Objects flow or distribution Human, tools, shaker components | MMSM performance including its angle, speed, wear, force, screen failure, pressure washing, screen change, flow problems, overloading, mass clumping, poor fluid rheology |
| Tracer | Unique man-made identifier added (shape, color, size) | Used to calculate lag depth, hole volume, pump efficiency, sweep efficiency, hydraulics, and calibrate computer vision system |
| Rubble | Unique formation (rock) generated identifier (shape, size, volume) | Non-Shale - Formation unconformities not related to stress(cavings) that identify trouble/transition zones (lost circulation, influx) |
| Metal | BHA generated, or equipment failure | BHA components including bit, motor, MWD, LWD, float equipment |
| Plastic | BHA generated, or equipment failure | BHA components including motor, MWD, and LWD. Float equipment |
| Rubber | BHA generated or equipment failure | BHA components motor, MWD, LWD. Float equipment |

A user interface engine 416 may use information from detection and classification engine 412, the calculation and alert generation engine 414, and other information, such as the data, images, and other information captured in environment 100 (including System Data 100), to generate a GUI. In some aspects, the GUI generated has a relatively low data requirement sufficient to transmit over a low bandwidth network.

The user interface engine 416 may provide data visualization for displaying a user interface on a display device. As an example, the user interface engine 416 generates a native and/or web-based graphical user interface (GUI) that accepts input and provides output viewed by users of a computing device, such as the computing devices described herein. The user interface engine 416 may provide real-time, automatic, and dynamically refreshed GUI using object imaging and detection information.

In aspects of the technology, the user interface engine 416 provides a representative image of objects in an object flow. This representative image may have a smaller data footprint than the originally captured image. For example, ROI may be represented with a white background. Objects classified as cuttings may be represented by simple black and white graphical representations (e.g., a black square). Other information, such as fluid, may be excluded from the graphical representation. This may allow for relatively smaller image data to be transmitted across a network. In some applications such as remote offshore drilling, this may help facilitate communication between the offshore rig and another team.

According to an example, users may access dashboards and reports using on-premise and cloud-based web displays. Live displays include sampled images showing the field of view, live distribution indicators, and alert history. Exception reports show the corresponding image and the measured parameters of the objects. The graphical user interface described with reference to FIGS. 7A and 7B may be produced using the user interface engine 416.

Additionally illustrated is training engine 418. Training engine 418 selects images for training with a DNN. Selection may occur when the image identifies unknown objects. The training engine also receives tagged data and provides the tagged data to a DNN. For example, a training engine 418 may provide image data through a graphical user interface to a user to classify objects in a region of interest. In one example, a user may be presented with an image captured by an imaging device. The image may be divided into various sections. The user may then be prompted to select all sections that have cuttings, large cuttings, debris, metallic objects, etc. Upon selection, the image will be tagged and provided to the DNN for training. It will be appreciated that other methods of training image data are contemplated.

Figure 5:
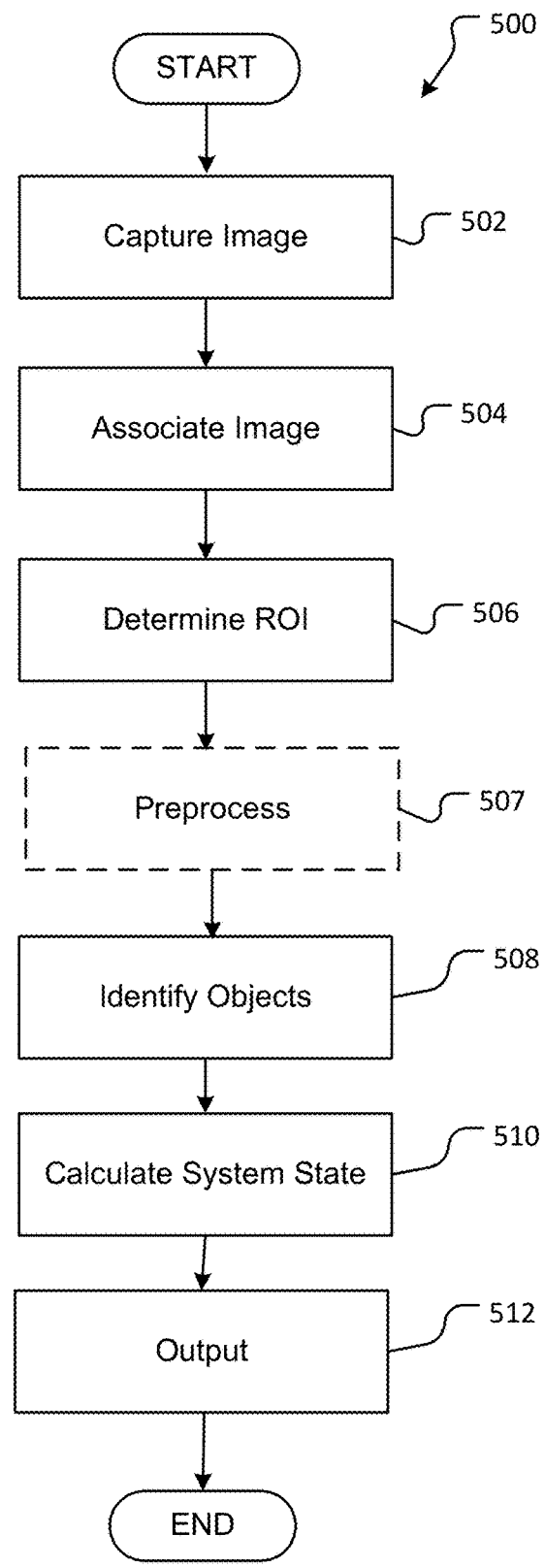
FIG. 5 is a method of performing object imaging and detection.

FIG. 5 is a method 500 of performing object imaging and detection of objects in an MMSM by the object imaging and detection system according to an example of the instant disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

Method 500 begins with capture image operation 502. In operation 502, an image is captured using an image capture device, such as the imaging devices discussed herein and the imaging system 104 discussed with reference to FIG. 1. The image may also be an image formed by translating sensor information using a wavelet filter. Such signal information may include electrical current and accelerometers associated with an imaging system, such as imaging system 104.

Method 500 then proceeds to associate an image with operational parameters operation 504. In operation 504, the image may be associated with various operational parameters. For example, the time of the image capture, the positional information of the drill bit or other rig information at the time of image capture (such as for example drill rig information as provided by drill rig device 194), the various environmental data (such as data captured by environmental sensors 180), and/or other System Data 100 may be associated with the image. The association may be stored in a database, such as in a networked storage device 190.

Method 500 then proceeds to determine ROI operation 506. In operation 506, one or more ROIs are determined. The ROI may be a portion or the entirety of a field of vision of an image captured by a vision system, such as a vision system 104. One or more imaging devices may be located such that the regions of interest include an object flow, a portion or the entirety of an MMSM, or the like, and the ROI may include a first object flow and a second object flow. A first object flow may be selected as the ROI because the first object flow is wetter than a particular threshold and the second object flow is drier than the particular threshold. As an example, a portion of the at least one region of interest may be in freefall. As another example, a portion of the at least one region of interest may capture flying objects (e.g., objects bouncing above a shaker screen). As an example, a first region of interest may trigger and/or define a second region of interest dynamically based on information analyzed in the first region of interest. For example, the ROI may be determined based on the information associated with the image or other information. Additionally, an ROI may be selected to determine the state of an MMSM. Thus, the ROI may be of a screen of a shaker or other portion of a shaker. Determining an ROI is more fully detailed with respect to FIG. 6.

A particular, non-limiting example of determining an ROI is as follows. A field of view may include a screen shaker having a ledge where objects in the object flow fall of the shaker enter free fall. The ledge may be automatically detected in the image data using the preprocessing techniques described herein and/or manually identified. Additionally/alternatively, a DNN may be used. For example, a region of interest may be selected by identifying the width of the shaker screen, a top edge, and a bottom edge. The distance from the top edge to the bottom edge may automatically be determined to ensure that at least one object in free fall is captured (e.g., the ROI is not so small as to not capture any single object).

In aspects of the technology, the images are captured using a video camera having a Frame rate per second (FPS). The distance of the bottom edge from the top edge may be determined such that each successive frame includes all new objects but no (or few) objects are missed. This may be accomplished by identifying the time/distance it takes for an object to fall through the ROI and setting the vertical length of the ROI such that the FPS matches the time it takes for an object to fall through the falling zone. In aspects, the traveled distance is determined by the kinematic equation $d=v_i*t+\frac{1}{2}*a*t^2$ where the initial vertical velocity of objects at the ledge is equal to 0 m/s and the acceleration is the gravity acceleration g=9.8 m/s2.

As a particular example, where the FPS of an imaging device is 30, the vertical length of the ROI may be selected such that an object entering the falling zone (i.e., starting to fall) takes $\frac{1}{30}^{th}$ of a second to pass through the ROI. This allows, for certain applications, easier calculation of the volume of objects in an object flow because duplicate counting may be avoided.

Method 500 optionally proceeds to preprocess image operation 507. In operation 507 image data is preprocessed. In aspects of the technology, image data associated with one or more ROIs is normalized prior to sending the image data to a DNN for object detection and classification. For example, an edge of a shaker may be identified using edge detection, blob detection, or a trained DNN (or other techniques). The image may then be rotated such that image data fed to a DNN has a more uniform orientation (e.g., with the edge of a shaker table parallel to horizontal access). Additionally, the image may be white balanced, brightness equalization, and or cropped to provide a classification DNN with a more uniform image data (e.g., one with a standard pixel size such as 256×256, 224×224, etc., one that does not have large variation in white balance, brightness equalization, etc.). Light correction may be performed. In aspects of the technology, light correction may be performed by segmenting an ROI into segments (e.g., segmenting by channels of an MMSM, which may be detected using a DNN, edge detection, or other technique). A histogram may be applied to each segment. Other parameters such as color, bit depth, aspect ratio, etc. may be adjusted to better represent values for which the DNN has been trained. This may be done to send relatively more normalized (e.g., rotated in a particular way, light corrected) image data to a DNN, such as the DNN described with reference to operation 508. One advantage to preprocessing is that a DNN need not be significantly retrained for each imaging device across multiple MMSM, rig sites, weather conditions, lighting conditions, etc.

Method 500 proceeds to identify objects operation 508. In operation 508, image analysis is applied to the one or more ROIs (as optionally preprocessed in operation 507) to detect and classify one or more objects in an image and/or one or more characteristics of a wavelet image. For example, in operation 508 at least one wellbore object is identified using the image information. Detection may occur using a DNN. Additionally, the operation 508 may further include detecting an absence of the at least one wellbore object using the image information. Additionally, the characteristics of the at least one detected wellbore object may be identified. This includes various physical properties, such as shape, volume, mass, material type, volume, a user-defined type, or another feature that may be trained using a DNN. Further, the DNN may be trained to identify MMSM wear, such as damage to a screen, build-up on a screen, uneven table leveling, overflow of a shaker, and the like. Further, the DNN may be trained to identify objects outside of the object flow, such as the presence of a pressure washer (indicating pressure washing), a screen change out, and/or screen removal. As noted herein, the classifying may be based on machine learning and by tuning the image captured by the vision system.

Method 500 proceeds to calculate system state operation 510. In operation 510, the detected and classified objects (and/or other information) identified in operation 508 are used to calculate one or more system states. For example, the number, rate of change, and acceleration of change of objects/signals are aggregated and compared to a normal and/or setpoint. The normal and or setpoint may automatically update based on the data associated with the image in operation 504. Additionally, the presence or absence of MMSM wear, increased frequency of events such as pressure washing, etc., may be aggregated. After comparison, one a wellbore state, including average cuttings volume, drill rig performance, the likelihood of well failure, productivity region of well, the safety level of region of well, drill bit state, MMSM state, screen state may be determined.

The method 500 then proceeds to output operation 512. In output operation 512, the number of objects, the type of objects, and or the system state may be output to a GUI, such as the GUIs described herein.

Figure 6:
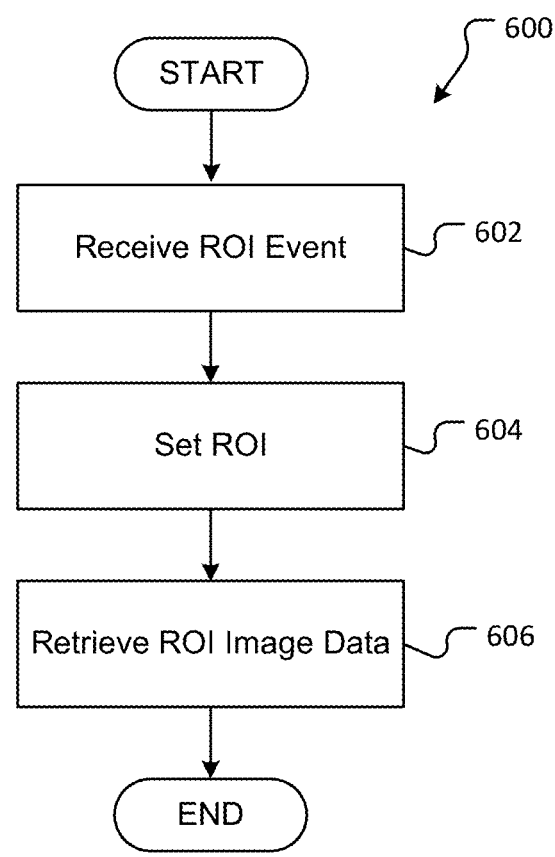
FIG. 6 illustrates a method for setting an ROI.

FIG. 6 illustrates a method for setting an ROI. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence. Method 600 begins with receiving ROI event operation 602. In operation 602 an ROI event is received. An ROI event is data that is received by an object imagining and detection application, such as the object imaging and detection application 406, that causes the program to set, change, remove, and/or add additional ROIs for analysis. Table II below provides example ROI events and corresponding potential actions regarding ROIs:

TABLE II

| Event | Action |
|---|---|
| System Initialization | ROIs set at predetermined areas such as the falling zone of MMSM |
| Potential Object of Interest Detected Potential failure detected | Additional ROIs set downstream to analyze more/higher resolution image devices. Increase ROI. |
| No deviations from norm | Change ROI number, lower resolution, and/or decrease the size of ROI. |
| Changing drilling parameters | Adjust size, shape, and number of ROIs accordingly |
| Human Activity | ROI set to increase to image maintenance activities |
| Illumination level | Shift ROI region |
| Audio, current, or other sensor input | Expand region of interest |
| Imaging conditions suboptimal | Adjust illumination, filters, wipers, wavelengths, etc. to improve image quality |

Method 600 then proceeds to retrieve ROI image data 606. The ROI may be applied to real-time or near real-time image data. Additionally, the ROI may be applied to historical data. In operation 606, the image data of the ROI is retrieved and sent to a detection and classification engine such as detection and classification engine 412 for image detection and classification.

Figure 7:
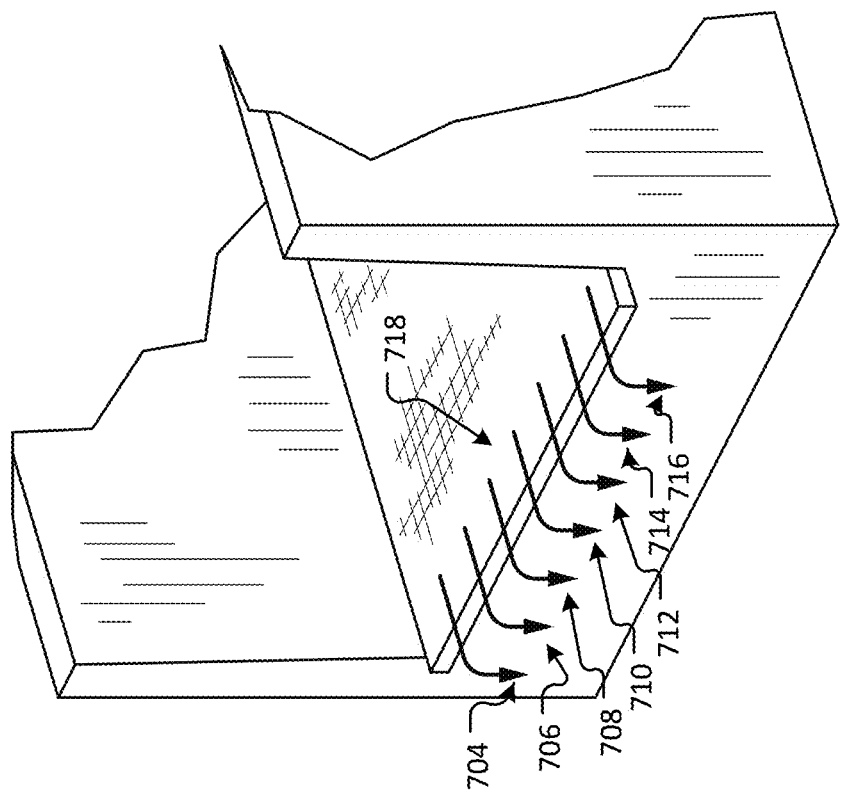
FIG. 7 is an example illustration of channels of an MMSM.

FIG. 7 is an example illustration of channels of an MMSM 702 having a screen 718. Illustrated is a first channel 704, a second channel 706, a third channel 708, a fourth channel 710, a fifth channel 712, a sixth channel 714, and a seventh channel 716. Channels are paths of travel of one or more objects in an object flow. These paths of travel may be influenced by the MMSM screen type, screen condition, and operation state (e.g., dirty, clean, broken, etc.). The number of channels may be preset by a user of the systems described herein. Alternatively, a DNN may automatically identify channels using training data. Objects in object flow may be aggregated by channel and displayed using the GUIs described herein.

Figure 8:
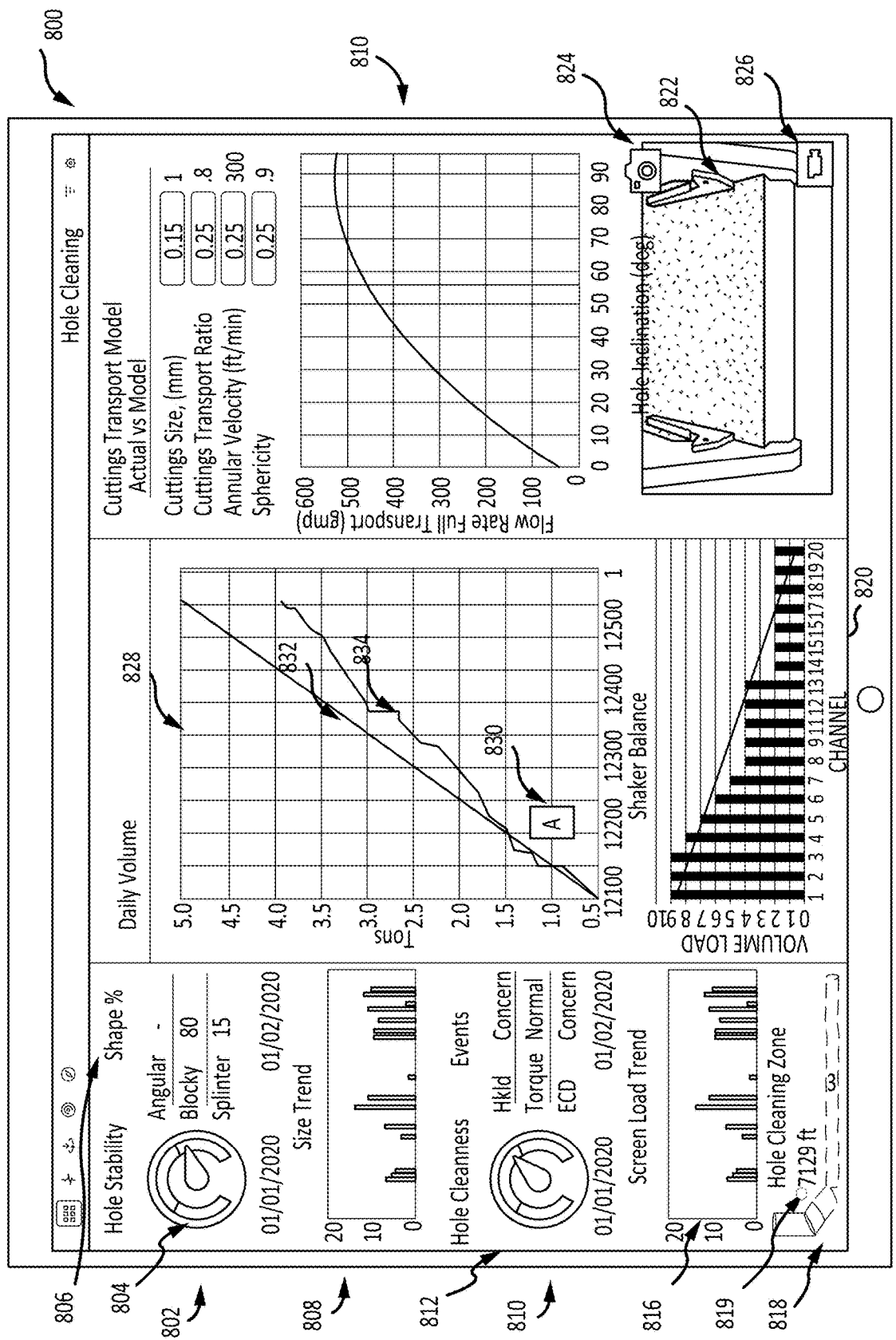
FIG. 8 illustrates an example of a GUI displayed on a computing device.

FIG. 8 illustrates an example of a GUI displayed on a computing device 800 (as illustrated, a tablet), which may be generated using the systems and methods described herein, including generated using the user interface engine 418 as described above.

Graphical element 802 is a graphical element that includes a hole stability dial 804, a shape percentage zone 806, and a hole histogram 808. Each relates to the state of hole stability. The graphical output may change based on a determined hole stability (which may be calculated using the calculation and alert generation engine 414). Nonlimiting examples include determining that tracked cavings have a higher than normal (as compared to a setpoint, for example) average number per time unit, a rate of change of the rate that is higher than normal (as compared to a setpoint, for example), etc. As a particular example, a large number of cavings or large increase in the number of cavings per time may indicate a poor hole state and be a critical situation. If no amount or low cavings volume are detected by the DNN the system may determine that wellbore stability is okay. Based on this determination, a graphical output may be generated, including hole stability dial 804, which illustrates a dial graph having three segments and a pointer. In aspects, the graphical output of conditions is presented in a traffic light color scheme denoting three levels (red=critical, yellow=caution, green=okay).

Shape percentage zone 806 is a table reflecting the shape of cavings. The shape of the caving may be identified using the detection and classification engine 412 as described herein. In examples, cavings detected are identified by their shape (e.g., angular, blocky, splinter). Detection may occur using a trained DNN. A user interface engine 416 may output information sufficient to have the relative percentage of each shape depicted in a GUI, such as shape percentage zone 806. For certain applications, the shape is a key geomechanics indicator of wellbore stability and describes the potential formation stress type failure. Thus, the shape of cavings may also impact hole stability and the hole stability dial 804. A hole histogram 808 shows the caving size detection events over time while the well is being drilled.

Graphical element 810 is a state of hole cleanliness that includes a hole cleanliness dial 812, an events indicator 814, and a screen load trend histography 816. The systems and methods described herein may determine and identify various events. For example, information gleaned from image data may be compared to rig status data as supplied by other database/systems (for example, from a rig EDR system) to identify variances in operational parameters such as fluid pumping flowrate, hook load (HKLD), equivalent circulating density (ECD), torque, drill rotational speed (RPM), rate of penetration (ROP), mud rheology, hole diameter, and drilling angle. Each may indicate the cleanliness of a hole. For example, the theoretical ROP for the pumping flow rate while drilling may be compared to the actual current ROP as determined using image data or empirical or cuttings transport models. If the actual ROP rate is too high (i.e., generating more drilled cuttings than can be efficiently removed), the events log 814 may indicate a yellow or red depending on the severity of the event. In aspects of the technology, the events section uses a Bayesian model to predict degrees of concern of hole cleanness based on the rig's EDR parameters like HKLD, ECD, and torque. This information may be used to generate hole cleanliness dial 812. In aspects, the graphical output of conditions is presented in a traffic light color scheme denoting three levels (red=critical, yellow=caution, green=okay).

As illustrated, screen load trend histography 816 denotes the volume or mass of cuttings, cavings, or other user-selected object classification detected at the MMSM using the systems and methods described herein. The screen load time can be toggled via user interaction (e.g., touching an area of the screen load time chart) to show other data.

Well icon 818 is an example icon that represents the current depth and angle of the well with an indication of hole cleaning status by zone. Each zone has unique parameters and methods for efficient hole cleaning and changes to operational drilling parameters in one zone may affect the other's ability to be cleaned. Drill element 819 indicates where deviations may be occurring based on where the BHA is located while either circulating or drilling.

Additionally illustrated is shaker balance graph 820. A shaker balance graph 820 is a visual representation of the volume of material exiting the MMSM. The x-axis represents the channel on a shaker. The y-axis is the number of cuttings observed in that channel. The shaker balance graph 820 may be used by an operator to monitor the cuttings volume distribution as it exits the MMSM, which may inform the driller of MMSM's horizontal and vertical alignment and make adjustments accordingly. In aspects of the technology, detection and classification engine 412 determines the number of cuttings and/or the cutting volume flowing through each channel of the shale shaker over time.

Video image 822 is also a part of the GUI displayed by computing device 800. The video may be a live data feed, or it may be historical image data (e.g., a video or still image) of a field of view, a region of interest, or other video data captured by a vision system, such as vision system 104 described above. A user may interact with computing device 800 using various input devices to configure the video to show the video image across the entire display screen of the computing device. In aspects of the technology, this will minimize the other sections.

As illustrated, a screen capture button 824 enables the user to manually capture and save the image(s) with an event marker, timestamp, and comment field. A user may interact with screen capture button 824 to cause screen capture when a user sees something of interest like a metal object or blinding screen. In examples, the screenshot may be used to track an event like following a pumped sweep or tracer to determine the time or volume required for it to be returned to the MMSM.

Additionally illustrated is video button 826. In examples, the video button 826 is a user interactive button that when interacted with (e.g., via touch or a mouse click) a new screen is presented to the user. In examples, the new screen provides information on imaging device settings, such as aperture speed, resolution setting, and environment. Entry fields for comments and tags may be included. Additionally illustrated is the Event Marker Button 830. In aspects when event marker button 830 is pressed more detailed information is available to the user.

Graph 828 illustrates an example GUI representation indicating the state of the cuttings removed for a selected time period as a function of the rate of penetration and hole diameter. The x-axis is the number of cuttings and the y-axis is the number of linear feet drilled. Line 832 illustrates an expected value of cuttings per foot hole drilled. Line 834 is the measured value, as captured and calculated using the imaging detection systems described herein.

FIG. 9A is an example diagram of a distributed computing system 900 in which aspects of the present innovative technology, including the object imaging and detection engine described above, may be implemented. According to examples, any computing devices, such as a modem 902A, a laptop computer 902B, a tablet 902C, a personal computer 902D, a smartphone 902E, and a server 902F, may contain engines, components, engines, etc. for controlling the various equipment associated with image capture and detection. Additionally, according to aspects discussed herein, any of the computing devices may contain the necessary hardware for implementing aspects of the disclosure. Any and/or all of these functions may be performed, by way of example, at network servers and/or server when computing devices request or receive data from external data providers by way of a network 920.

Figure 9B:
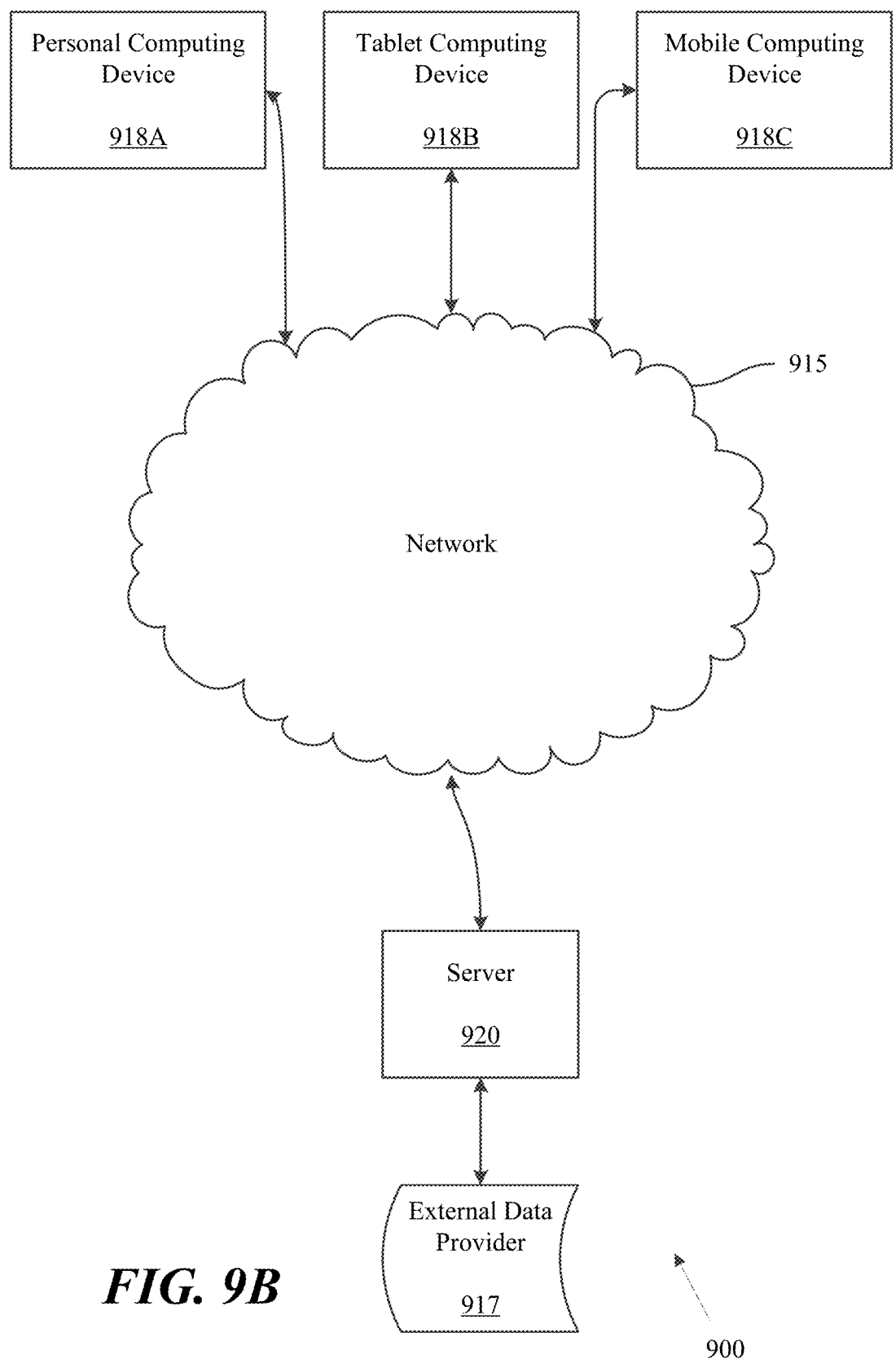

Turning to FIG. 9B, one embodiment of the architecture of a system for performing the technology discussed herein is presented. Content and/or data interacted with, requested, and/or edited in association with one or computing devices may be stored in different communication channels or other storage types. For example, data may be stored using a directory service, a web portal, a mailbox service, an instant messaging store, or a compiled networking service for image detection and classification. The distributed computing system 900 may be used for running the various engines to perform image capture and detection, such as those discussed with reference to FIG. 4. The computing devices 918A, 918B, and/or 918C may provide a request to a cloud/network 915, which is then processed by a network server 920 in communication with an external data provider 917. By way of example, a client computing device may be implemented as any of the systems described herein and embodied in the personal computing device 918A, the tablet computing device 918B, and/or the mobile computing device 918C (e.g., a smartphone). Any of these aspects of the systems described herein may obtain content from the external data provider 917.

In various examples, the types of networks used for communication between the computing devices that make up the present invention include, but are not limited to, the Internet, an intranet, wide area networks (WAN), local area networks (LAN), virtual private networks (VPN), GPS devices, SONAR devices, cellular networks, and additional satellite-based data providers such as the Iridium satellite constellation which provides voice and data coverage to satellite phones, pagers, and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer-readable storage medium. The software, firmware, or similar sequence of computer instructions may also be encoded within a carrier-wave signal for transmission between computing devices.

Operating environment 1000 typically includes at least some form of computer-readable media. Computer-readable media can be any available media that can be accessed by a processor such as processing device 1080 depicted in FIG. 10 and processor 1102 shown in FIG. 11 or other devices comprising the operating environment 1000. By way of example, and not limitation, computer-readable media may comprise computer storage media and communication media. Computer storage media includes volatile and non-volatile, and removable and non-removable media implemented in any method or technology for storage of information such as computer-readable instructions, data structures, program engines, or other data. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer-readable instructions, data structures, program engines, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

The operating environment 1000 may be a single computer operating in a networked environment using logical connections to one or more remote computers. The remote computer may be a personal computer, a GPS device, a monitoring device such as a static-monitoring device or a mobile monitoring device, a pod, a mobile deployment device, a server, a router, a network PC, a peer device, or other common network nodes, and typically includes many or all of the elements described above as well as others not so mentioned. The logical connections may include any method supported by available communications media. Such networking environments are commonplace in enterprise-wide computer networks, intranets, and the Internet.

Figure 11:
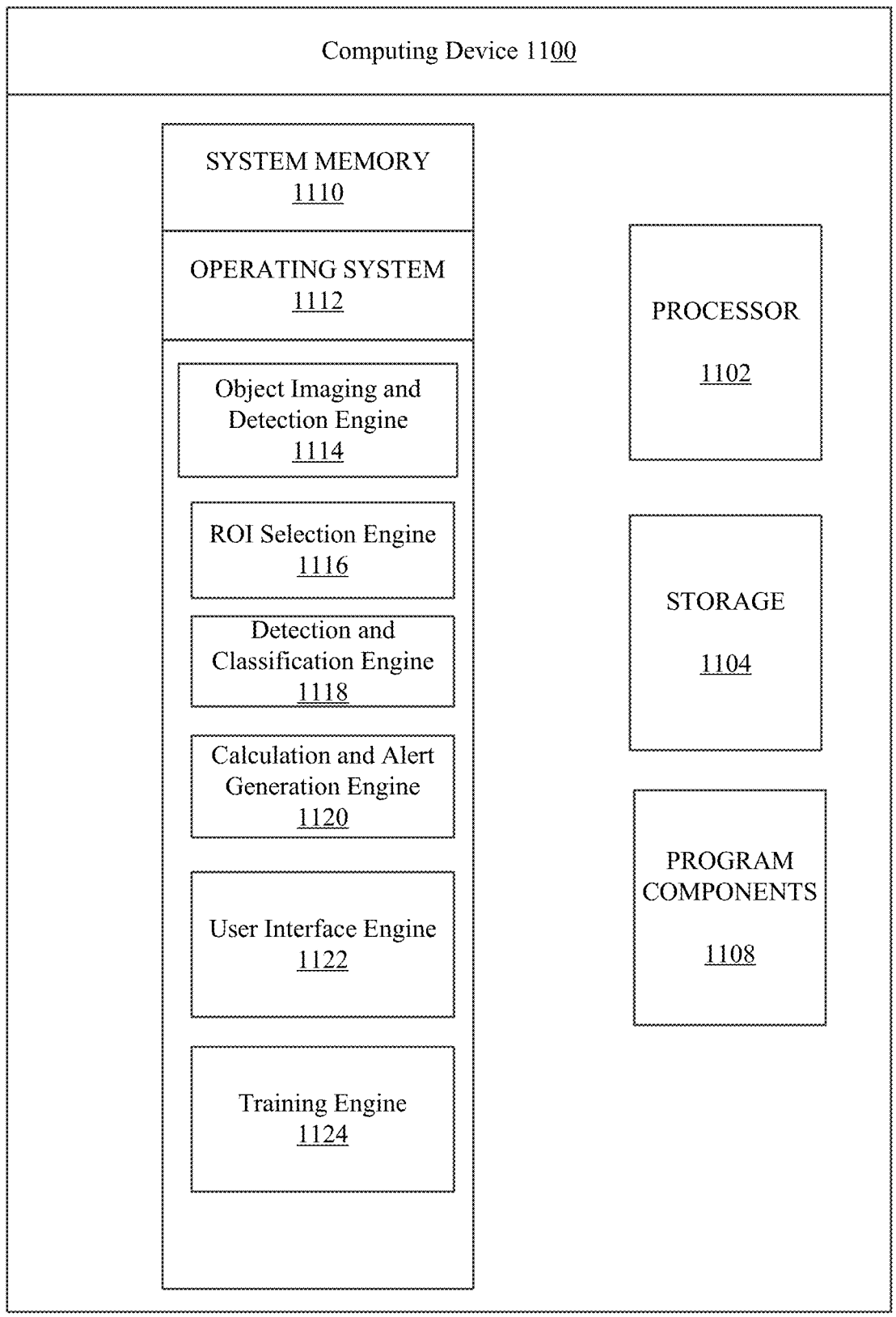
FIG. 11 is a block diagram illustrating additional physical components (e.g., hardware) of a computing device 1100 with which certain aspects of the disclosure may be practiced.

FIG. 11 illustrates one aspect of a computing system 1100 that may be used to implement aspects of the present disclosure, including any of the plurality of computing devices described herein with reference to the various figures and their corresponding descriptions. The computing device 1110 illustrated in FIG. 11 can be used to execute an operating system 1096, application programs 1098, and program engines 1003 (including the engines described with reference to FIG. 4) described herein.

The computing device 1010 includes, in some embodiments, at least one processing device 980, such as a central processing unit (CPU). A variety of processing devices are available from a variety of manufacturers, for example, Intel, Advanced Micro Devices, and/or ARM microprocessors. In this example, the computing device 1010 also includes a system memory 1082, and a system bus 1084 that couples various system components including the system memory 1082 to the at least one processing device 1080. The system bus 1084 is one of any number of types of bus structures including a memory bus, or memory controller; a peripheral bus; and a local bus using any of a variety of bus architectures.

Examples of devices suitable for the computing device 1010 include a server computer, a pod, a mobile-monitoring device, a mobile deployment device, a static-monitoring device, a desktop computer, a laptop computer, a tablet computer, a mobile computing device (such as a smartphone, an iPod® or iPad® mobile digital device, or other mobile devices), or other devices configured to process digital instructions.

Although the exemplary environment described herein employs a hard disk drive or a solid state drive as a secondary storage device, other types of computer-readable storage media are used in other aspects according to the disclosure. Examples of these other types of computer-readable storage media include magnetic cassettes, flash memory cards, digital video disks, Bernoulli cartridges, compact disc read-only memories, digital versatile disk read-only memories, random access memories, or read-only memories. Additional aspects may include non-transitory media. Additionally, such computer-readable storage media can include local storage or cloud-based storage.

A number of program engines can be stored in the secondary storage device 1092 or the memory 1082, including an operating system 1096, one or more application programs 1098, other program engines 1000 (such as the software engines described herein), and program data 1002. The computing device 1010 can utilize any suitable operating system, such as Linux, Microsoft Windows™, Google Chrome™, Apple OS, and any other operating system suitable for a computing device.

According to examples, a user provides inputs to the computing device 1010 through one or more input devices 1004. Examples of input devices 1004 include a keyboard 1006, a mouse 1008, a microphone 1009, and a touch sensor 1012 (such as a touchpad or touch-sensitive display). Additional examples may include input devices other than those specified by the keyboard 1006, the mouse 1008, the microphone 1009, and the touch sensor 1012. The input devices are often connected to the processing device 1080 through an input/output (I/O) interface 1014 that is coupled to the system bus 1084. These input devices 1004 can be connected by any number of I/O interfaces 1014, such as a parallel port, serial port, game port, or universal serial bus. Wireless communication between input devices 1004 and the interface 1014 is possible as well and includes infrared, BLUETOOTH® wireless technology, cellular, and other radio frequency communication systems in some possible aspects.

In an exemplary aspect, a display device 1016, such as a monitor, liquid crystal display device, projector, or touch-sensitive display device, is also connected to the computing system 1000 via an interface, such as a video adapter 1018. In addition to the display device 1016, the computing device 710 can include various other peripheral devices, such as speakers or a printer.

When used in a local area networking environment or a wide area networking environment (such as the Internet), the computing device 1010 is typically connected to a network such as network 920 shown in FIGS. 9A and 9B through a network interface, such as an Ethernet interface. Other possible embodiments use other communication devices. For example, certain aspects of the computing device 1010 may include a modem for communicating across the network. The computing device 1010 typically includes at least some form of computer-readable media. Computer-readable media includes any available media that can be accessed by the computing device 1010. By way of example, computer-readable media include computer-readable storage media and computer-readable communication media.

Figure 10:
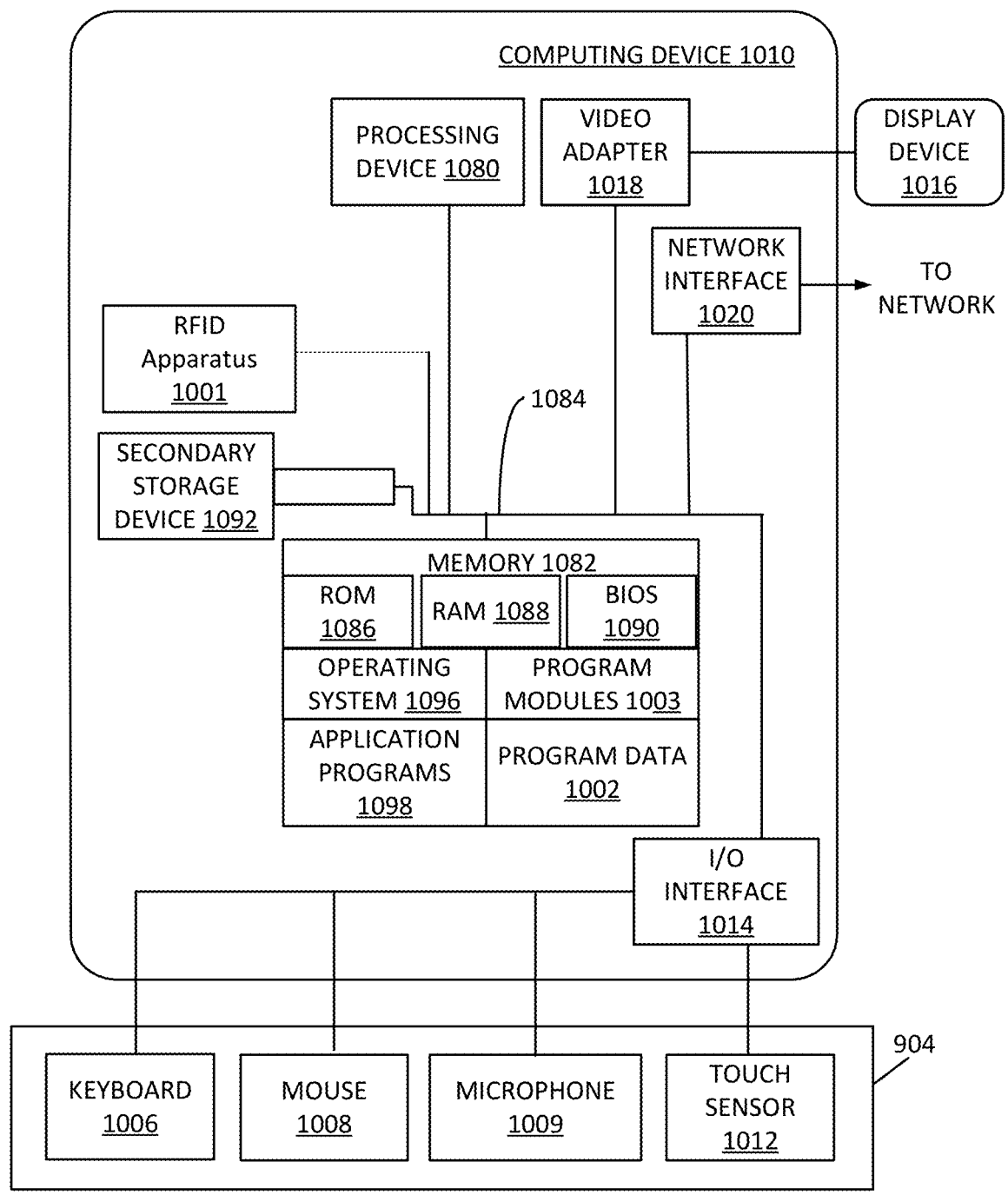
FIG. 10 is a block diagram illustrating additional physical components (e.g., hardware) of a computing device.

The computing device 1010 illustrated in FIG. 10 is also an example of programmable electronics, which may include one or more such computing devices, and when multiple computing devices are included, such computing devices can be coupled together with a suitable data communication network so as to collectively perform the various functions, methods, or operations disclosed herein.

FIG. 11 is a block diagram illustrating additional physical components (e.g., hardware) of a computing device 1100 with which certain aspects of the disclosure may be practiced. Computing device 1100 may perform these functions alone or in combination with a distributed computing network such as those described with regard to FIGS. 9A and 9B which may be in operative contact with personal computing device 918A, tablet computing device 918B and/or mobile computing device 918C which may communicate and process one or more of the program engines described herein.

In a basic configuration, the computing device 1100 may include at least one processor 1102 and a system memory 1110. Depending on the configuration and type of computing device, the system memory 1110 may comprise, but is not limited to, volatile storage (e.g., random access memory), non-volatile storage (e.g., read-only memory), flash memory, or any combination of such memories. The system memory 1110 may include an operating system 1112 and one or more program engines 1114. The operating system 1112, for example, may be suitable for controlling the operation of the computing device 1100. Furthermore, aspects of the disclosure may be practiced in conjunction with a graphics library, other operating systems, or any other application program and are not limited to any particular application or system.

The computing device 1100 may have additional features or functionality. For example, the computing device 1100 may also include an additional data storage device (removable and/or non-removable) such as, for example, magnetic disks, optical disks, or tape. Such additional storage is illustrated in FIG. 11 by storage 1104. It will be well understood by those of skill in the art that storage may also occur via the distributed computing networks described in FIG. 9A and FIG. 9B. For example, computing device 1100 may communicate via network 920 in FIG. 9A and data may be stored within network servers 906 and transmitted back to computing device 1100 via network 920 if it is determined that such stored data is necessary to execute one or more functions described herein. Additionally, computing device 1100 may communicate via network 920 in FIG. 6B and data may be stored within network server 906 and transmitted back to computing device 900 via network 920 if it is determined that such stored data is necessary to execute one or more functions described herein.

As stated above, a number of program engines and data files may be stored in the system memory 1110. While executing the at least one processor 1102, the program engines 1114 (e.g., the engines described with reference to FIG. 4) may perform processes including, but not limited to, the aspects described herein.

Figure 12:
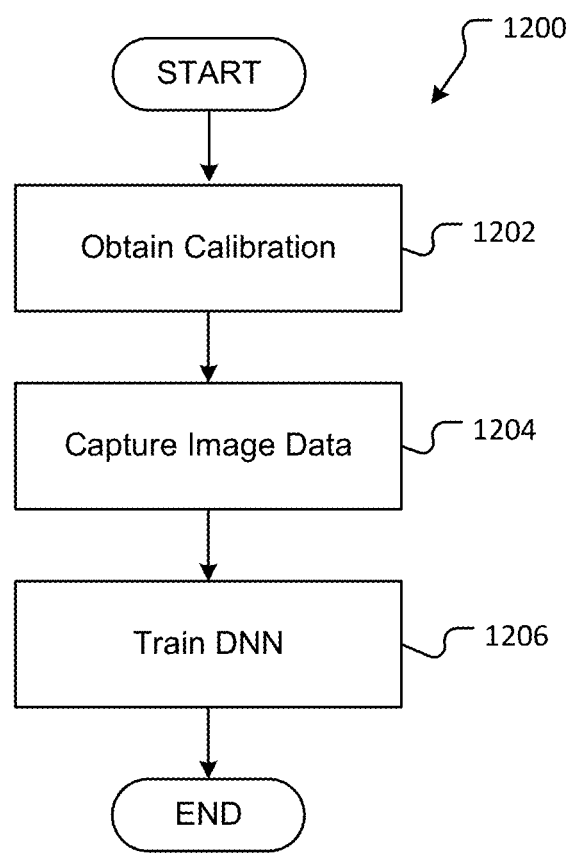
FIG. 12 illustrates a method of measuring the volume and/or mass of a shaker load coming across the shaker using a vision system

FIG. 12 illustrates a method of measuring the volume and/or mass of a shaker load coming across the shaker using a vision system. FIG. 12 is discussed with respect to well environment 1300 having an MMSM 1302 and a vision system 1306 in electronic communication with an object imaging and detection engine (not shown). It will be appreciated that vision system 1306 may have the same or similar properties as the vision systems discussed with reference to FIG. 1 such as vision system 104 and the object imaging detection engine has the same or similar properties as discussed with reference to FIGS. 1 and 4.

Method 1200 begins with obtaining calibration operation 1202. To obtain calibration operation 1202 a known volume/mass of cuttings and or object flow is obtained. Known volume/mass may be obtained in a variety of ways. A cuttings volume meter (CVM) may be used to identify the volume/mass of cuttings, fluids, and other objects coming off of the shaker table.

Additionally/alternatively, the object flow of a shaker table may be collected into a container of known volume. The container may be weighed, and the constituent parts of the flow may be separated to determine the volume and mass of cuttings, cavings, liquids, and other objects in an object flow 1308. Operation 1202 may be repeated numerous times for object flow with various liquid to solid content, liquid densities, number of objects, etc. The result of operation 1202 is a mass/volume of cuttings, cavings, drilling fluid, and or other objects in the object flow.

Figure 13:
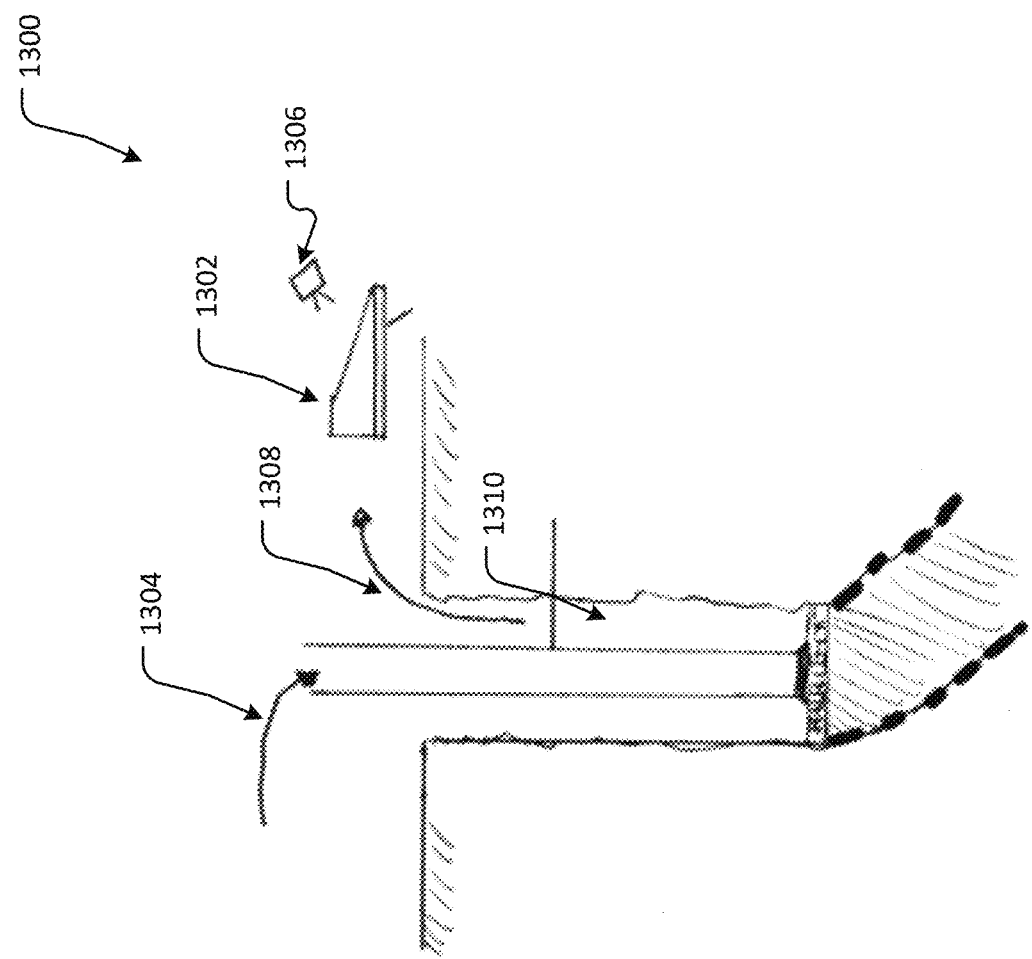
FIG. 13 is an example well environment in which aspects of the technology may be used.

Calibration may also occur by drilling a well of known volume and tracking that volume through the system. For example, a well hole 1310 as shown in FIG. 13 may be formed by removing a certain volume and mass of rock. Drilling fluid 1304 displaces the drilling cuttings and other debris, causing the objects to flow up the wellhole in an object flow 1308 to be processed by one or more MMSMs 1302. In this way, the volume/mass of cuttings and rock removed may be known and/or estimated. In aspects of the technology, the fluid 1304 includes a tracer, or metal and rubber float equipment that is easily identifiable by vision system 1306.

Method 1200 also includes capture image data 1204 operation. In operation 1204, an image/video of the MMSM 1302 is captured during operation 1202 using imaging device 1306. In the case of calibration by drilling a well of known volume, the captured image may be associated with the object flow 1308 by identifying the tracer liquid such that all flow of objects from the wellbore is captured.

Method 1200 proceeds to train DNN 1206. A DNN may be trained using the calibration data captured in operation 1202 and associated with the image data captured at operation 1204. This results in a trained DNN such that images of object flows at various ROIs may be analyzed by a DNN and a cuttings volume, cuttings mass, liquid volume, liquid mass, and/or other objects may be estimated using the image data.

Once calibrated, image data may be used to identify potential issues with drilling. For example, drilling while drilling the hole can become enlarged to a size larger than the drilling bit diameter due to vibration, wellbore instability, and excessive flow rates. These enlarged zones can be referred to as washouts and cause significant problems with hole cleaning. Conversely, the hole can become reduced if the formation swells creating restrictions for the BHA. Once calibrated, image data may be used to identify object flow that indicates a greater or smaller than usual for the expected drill hole size.

Figure 14:
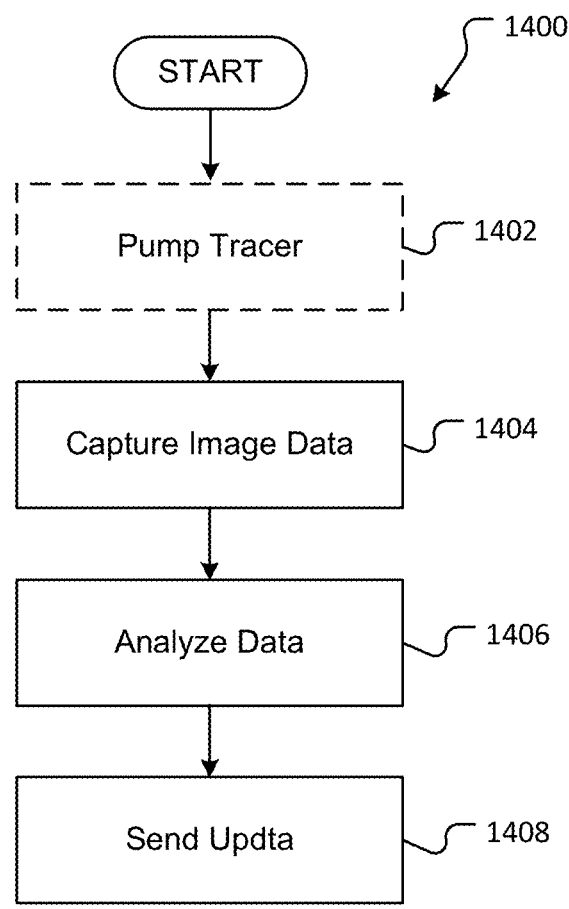
FIG. 14 is a method 1400 to update a cuttings-transport model.

FIG. 14 is a method 1400 to update the cuttings transport model. Method 1400 optionally begins with a pump tracer into well operation 1402. In some aspects of the technology, the tracer may be easily identified by a vision system 104 and an object imaging and detection engine 406.

Method 1400 then proceeds to capture traced object flow operation 1404. In operation 1404, the object flow with tracer is captured using a vision system, such as the vision system described herein.

Method 1400 then proceeds to analyze image data operation 1406. In operation 1406, the image data, which may include cutting size, shape, and sphericity, are analyzed to determine the volume of cuttings, liquid, cavings, etc.

Method 1400 then proceeds to send update operation 1408, where an update is sent to a cuttings transport model. In aspects of the technology, the measured volume/mass of the object flow is sent to the cuttings transport model.

It will be appreciated that the devices, systems, and methods for automatic analysis of wellbore objects described above may be used to identify a variety of issues associated with a wellbore. For example, the systems and methods described above may be used to identify deviations from a norm associated with features of the objects may, which in turn may be used to provide wellbore and rig equipment indicator information during drilling and pumping operations. As indicated above, wellbore objects can include cuttings, cavings, fluid, retained fluid, rubble, metal, plastic, rubber lost circulation material, and others. In examples, this mechanism improves the accuracy of determining the effectiveness during both types of operation, in real time. For example, monitoring real-time deviations in object size distribution, object shape distribution, object color, and object volume deviations using a relatively high data density can lead to increased sensitivity to deviations in rate of penetration, fluid properties, wellbore hydraulics, equipment condition, direction, casings, wellbore volume, lag depth, hole conditioning, and drilling parameters.

More specifically, monitoring deviations in wellbore objects' size, size distribution, shape, color, and volume during active drilling operations can lead to a better understanding of the current wellbore condition, drilling effectiveness, and hole cleaning efficiency in some examples. The relationship between deviations in these parameters and operational conditions may be expressed in a number of ways, including:

Determining the existence of underweighted fluid and over-pressured formations by detecting an increase in cavings, volume, and deviations in the size, volume, and shape distribution between cuttings and cavings. In some applications, cavings are not a result of the drill bit cutting action but instead a product of the formation as it undergoes failure due to a change in the stress field as it is penetrated. The cavings may be produced in various sizes and shapes commonly described as angular, splintery, blocky, and tabular.

Determining the existence of washout and over gauge wellbore sections by detecting caving or tracer deviations in size, volume, and shape distribution.

Information about the absolute and/or relative change in cutting volumes or other characteristics of cuttings coming off of the shaker table may, under certain conditions, be combined with circulation system parameters and/or other drilling parameters, such as the rate of penetration, and be relayed to the drilling engineer or other personnel. For example, a sudden change, either decreases or increases, in the cuttings volume not correlated to changing rate of penetration may indicate hole cleaning problems, influxes, and/or other changes in conditions. Additionally, a sudden change in the spatial characteristics of the cuttings may indicate a cave-in or other phenomena. Changes in size distribution may also indicate changes in morphology. Increases over the average volume of cuttings during drilling may indicate an increased rate of penetration; if the volume increases, and the rate of penetration does not, then a washout may have occurred. Outliers of an abnormal size may indicate drilling problems (e.g., increased metal cutting volume could indicate a broken bit).

Trends in the data (e.g., consistent changes in shape, size, and volume, according to threshold amounts of change of a selected time interval or intervals) may indicate progress or problems in an operation. Thus, the changes in data may be monitored as trends, and the trends may be output to a GUI for observation and action. Thus, the activity may comprise outputting by a computing device trends in the data.

The changes in shape, size distribution, or volume of the down hole cuttings may be correlated to a number of operational conditions. Thus, the conditions associated with the borehole drilling or borehole pumping operations may comprise one or more of rate of penetration, formation pore pressure, weight on bit, drill pipe torque, or drilling angle.

The changes in shape, size distribution, or volume of the down hole cuttings can also be correlated to operational efficiencies, such as drill bit cutting efficiency, or sweeping efficiency. Thus, a running indication of efficiency may be output via a GUI, if desired. Therefore, the activity may comprise indicating an efficiency of a borehole drilling operation or a borehole pumping operation as a sweeping operation, based on the data.

The systems and methods described herein may also automatically determine:

the existence of transition regions to salt, tar, or karst formations by detecting rubble rocks and deviations in the rubble;

the absence or presence of fluid and its retention on a wellbore object by detecting its light reflection, and color;

the rig fluid processing efficiency by detecting the ratio of liquids versus wellbore objects. This information may also be used to optimize, improve, or adjust the shale-shaker angle (saving mud, and/or increasing efficiency); alert an operator to expected and/or unexpected changes in the cuttings volumes which may, in some cases, be indicative of hole cleaning, influx, losses, and/or other problems; and show whether or not the volume and characteristics of cuttings exiting the shaker is less than, greater than or approximately commensurate with the rate of penetration ("ROP").

the efficiency of lost circulation material in under-pressured formations by detecting LCM size, shape, and volume. Determining the efficiency of bottom hole assembly (BHA) tool hole cleaning capabilities.

lag depth and wellbore volume by detecting injected tracers with unique size, shape, and color characteristics.

drilling and pumping rig equipment conditions by detecting non-formation wellbore objects including metal, plastic, and rubber objects.

drilling bit efficiency through analysis of cutting size, shape, and volume.

the probability that the hole is clean or stable by combining data generated by the object imaging and detection system.

sweep efficiency by monitoring wellbore objects' volume during a sweep operation (e.g., the volume of wellbore objects cuttings increases with increasing sweep efficiency, and then decreases as wellbore objects cuttings are moved out of the hole).

deviations in a geological formation composition by monitoring cutting size, size distribution, color, and shape.

Equipment failures, both planned and unplanned, may be detected as BHA and rig pump metal, plastic, and rubber components are detected.\ the fluid rheology information based on the height of the object flow bouncing in the shale shaker.

The systems and methods described herein may also be used to identify various wellbore conditions including:

Detected deviations in baseline size, volume, and shape of cavings may indicate the fluid rheology needs adjusting.

Deviations in the size, shape, and sphericity (due to grinding, bit dulling, etc.) of objects may be used to update the cuttings transport model to avoid inadequate object transport performance.

The absence/presence of objects in the ROI can detect deviations from normal operations (e.g., the lack of objects detected can indicate an MMSM not operating when it should be, the presence of fluid in the ROI can indicate an MMSM is not operating efficiently, and the absence of metal, plastic or rubber may indicate operations are normal.

Increased volume of cuttings during drilling, which may indicate an increased rate of penetration. In a particular example, if the volume increases and the rate of penetration does not, then a washout may have occurred.

Setting drilling or pumping choke pressure setpoints based on detecting and analyzing the caving shape, size, and volume to reduce cavings influx.

In some embodiments, measurements of the size, shape, color, and volume of objects over time are binned, to separate and quantify the occurrence of various measurements. The binned measurements can be used to determine an average, which is used to establish a baseline. Changes from the baseline can be alarmed to an operator's console, smartphone, or displayed in conjunction with the current drilling measurements, like the rig's EDR and used to change the execution of operations (e.g., changing pump speed, weight on the bit, circulation time or changing the rheology of a fluid) in some embodiments.

One example in which aspects of the technology may be implemented is as follows. The system may use a different number of cameras which could be all different models and brands. Also, video feeds may be used for different purposes like classification algorithms, object detection, quality control, live visualization, and archiving. In a non-limiting example, a digital video recorder (DVR) or a network video recorder (NVR) connects to all cameras and manages the video feeds for all the other image consumers, a one-to-many connection. Such a system could be based on commercially available products.

If the camera supports a camera initiated video stream, the DVR and/or NVR (or other similar devices now known or later developed) may also be on a listening mode where cameras initiate the connection and stream the video content to the DVR and/or NVR (or other similar devices now known or later developed), like a live stream. This allows the camera to broadcast information when needed, for example a video stream is broadcasted with lower frame per second and higher compression when a local algorithm running within the camera doesn't detect abnormal conditions.

When a deviation in the classified objects is detected, a command may be sent to the DVR and/or NVR (or other similar devices now known or later developed) using an Application Programming Interface (API) and instructed to adjust the corresponding camera streaming parameters to retrieve the streaming video at a higher frame rate and less compression. This will reduce data transmission bandwidth and data storage at the DVR and/or NVR (or other similar devices now known or later developed) level when no deviation is detected while maintaining high data quality when a deviation is detected.

The DVR and/or NVR (or other similar devices now known or later developed) receives, in examples, all images captured by the cameras, by requesting and subscribing to a video feed or by listening to camera-initiated broadcasts. The video feed and images are stored into a circular buffer based on physical storage like a mechanical or solid-state hard drive.

In an example, when a deviation in the classified objects is detected, a command may be sent to the DVR and/or NVR (or other similar devices now known or later developed) using an API to mark the video segment as an event to prevent overwriting in the circular buffer. The video segments are marked at a configurable delay before and after the event to provide contextual information. The saved video segments are then stored to a different storage device, which could be local or remote, metadata from measured and calculated metrics is attached to provide contextual information to the end-user. If bandwidth management is required, only the saved segment would be transferred for further review or processing.

The graphical user interface (GUI) may include a live video feed for selected cameras available in the system. In an example, the video feeds come from the DVR and/or NVR (or other similar devices now known or later developed) which optimizes the number of connections to the cameras and adapts resolution and video format to match the technology used to build the GUI. The GUI can also retrieve and control video playback from the DVR and/or NVR (or other similar devices now known or later developed) by using the API. Video can be retrieved by time or by video segments previously marked.

In an example, the resolution of the image and the size of the region of interest can impact the processing power required to perform object detection. To limit the required processing power, the classification algorithm may detect a deviation in the classified objects and when applicable pass a full resolution image to the object detection algorithm that will detect classified objects occurrences and detect further parameters like size, location, shape, type, texture, and color.

The following includes example aspects of the technology.

Aspect 1: A method comprising: identifying object flow from a wellbore and separated by at least one mechanical mud separation machine (MMSM), obtaining, by a vision system, information based on the object flow associated with at least one region of interest, detecting, by a computing device, at least one wellbore object using the information, classifying, by the computing device, characteristics of the at least one detected wellbore object using the information, and generating, by the computing device, one of an alert and an event notification associated with the characteristics of the at least one detected wellbore object.

Aspect 2: The method of Aspect 1, further comprising detecting an absence of the at least one wellbore object using the information.

Aspect 3: The method of Aspects 1 and 2, wherein the object flow comprises a first object flow and a second object flow, the method of claim 1 further comprising monitoring the first object flow that is drier than a particular threshold and the second object flow that is wetter than the particular threshold.

Aspect 4: The method of any of Aspects 1 to 3, wherein the vision system comprises at least one of a camera, an accelerometer, a microphone, and a weather device.

Aspect 5: The method of any of Aspects 1 to 4, wherein the camera comprises one of a high-definition camera, a spectral imaging device, an optical imaging device, an infrared imaging device, a LiDAR imaging device, and an ultraviolet imaging device.

Aspect 6: The method of any of Aspects 1 to 5, wherein the computing device comprises at least one of one or more central processing units (CPUs), one or more Field Programmable Gate Array (FPGA), one or more Application Specific Integrated Circuit (ASIC), one or more graphics processing units (GPUs), and one or more tensor processing units (TPUs).

Aspect 7: The method of any of Aspects 1 to 6, further comprising transmitting, by the computing device, one of the alerts and the event notification in real-time to a rig system associated with the wellbore.

Aspect 8: The method of any of Aspects 1 to 7, wherein a portion of the at least one region of interest is in freefall.

Aspect 9: The method of any of Aspects 1 to 8, wherein a portion of the at least one region of interest is flying.

Aspect 10: The method of any of Aspects 1 to 9, further comprising aggregating the information from the vision system and information obtained from a drilling rig data recorder to determine wellbore and operational conditions.

Aspect 11: The method of any of Aspects 1 to 10, further comprising obtaining, by the vision system at least one of image data, acoustic data, vibration data, and environment data from the at least one region of interest in the wellbore, identifying one of environmental and dynamic noise in the information, removing the environmental and dynamic noise in the information.

Aspect 12: A system including at least one mechanical mud separation machine (MMSM) to identify and separate object flow from a wellbore, a vision system to obtain information based on the object flow associated with at least one region of interest, and at least one computing device to: detect at least one wellbore object using the information, classify characteristics of the at least one detected wellbore object using the information, and generate one of an alert and an event notification associated with the characteristics of the at least one detected wellbore object.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed innovative technologies. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed:

1. A computer implemented method comprising:
receiving a field of view comprising image data from an imaging device capturing images of a mechanical mud separation machine ("MMSM");
selecting, from the image data, a region of interest ("ROI"), wherein selecting the ROI includes:
identifying a ledge of an MMSM within the image data, the ledge being a location where objects in an object flow begin to free fall;
setting a top edge of the ROI at the ledge;
identifying a frames per second of an imaging device capturing the image data;
calculating a vertical length of the ROI based on the frames per second of the imaging device and the ledge;
associating the image data with a timestamp that corresponds to a time at which the image data was captured by the imaging device.

2. The method of claim 1, further comprising: preprocessing the ROI to form a preprocessed ROI.

3. The method of claim 2, wherein the preprocessing comprises at least one selected from the group consisting of rotating the image data such that a ledge of the MMSM is substantially horizontally positioned, cropping the ROI to a specified pixel size, brightness equalization, and white balancing the image.

4. The method of claim 1, further comprising analyzing, using a DNN, the preprocessed ROI to identify a plurality of objects in an object flow;
identifying, using a DNN, a first object in an object flow; and
associating the object with a first-time stamp.

5. The method of claim 1, wherein identifying the objects comprises at least one of estimating the object's size, shape, or color.

6. The method of claim 1, further comprising:
analyzing, using a DNN, the ROI to identify a plurality of objects in an object flow;
classifying each of the plurality of objects to form a plurality of classified objects;
aggregating each of the classified objects into one or more groupings;
determining the number of classified objects within each of the one or more groupings;
comparing the number of objects within each of the one or more groupings to a threshold;
based on the comparison, determining that an anomaly is present; and
based on determining that an anomaly is present, sending a signal to begin capturing additional image data to an additional imaging device.

7. The method of claim 6, wherein the threshold is determined at least in part by signal data.

8. The method of claim 7, wherein the signal data comprises at least one selected from the group consisting of: a motor current, a temperature reading, a light meter, and a wind gage.

9. The method of claim 6, further comprising:
based on determining that an anomaly is present, sending a signal to the imaging device to change at least one image device setting selected from the group consisting of: a shutter speed, a frame rate per second, an aperture setting, and a resolution setting.

10. The method of claim 6, wherein the classified objects comprise cuttings and updating a cuttings transport model based on the classification of the cuttings.

11. The method of claim 6, wherein the classifying operation occurs at a different location from the receiving a field of view comprising image data operation.

12. A non-transitory computer-readable storage device storing instructions that, when executed, perform the method of
receiving a field of view comprising image data from an imaging device capturing images of a mechanical mud separation machine ("MMSM");
selecting, from the image data, a region of interest ("ROI"), wherein selecting the ROI includes:
identifying a ledge of an MMSM within the image data, the ledge being a location where objects in an object flow begin to free fall;
setting a top edge of the ROI at the ledge;
identifying a frames per second of an imaging device providing the image data;
calculating a vertical length of the ROI based on the frames per second of the imaging device and the ledge;
associating the image data with a timestamp that corresponds to a time at which the image data was captured by the imaging device.

13. The non-transitory computer-readable storage device of claim 12, wherein the method further comprises:
analyzing, using a DNN, the ROI to identify a plurality of objects in an object flow;
classifying each of the plurality of objects to form a plurality of classified objects;
aggregating each of the classified objects into one or more groupings;
determining the number of classified objects within each of the one or more groupings;

comparing the number of objects within each of the one or more groupings to a threshold;

based on the comparison, determining that an anomaly is present; and based on determining that an anomaly is present, sending a signal to begin capturing additional image data to an additional imaging device.

* * * * *